(12) United States Patent
Weston et al.

(10) Patent No.: US 8,294,592 B2
(45) Date of Patent: Oct. 23, 2012

(54) METHOD AND APPARATUS FOR INITIALIZATION OF A WELLBORE SURVEY TOOL VIA A REMOTE REFERENCE SOURCE

(75) Inventors: John Lionel Weston, Christchurch (GB); Eric Wright, Aberdeenshire (GB); Gary Uttecht, Houston, TX (US); Roger Ekseth, Trondheim (NO)

(73) Assignee: GYRODATA, Incorporated, Houston, TX (US)

( * ) Notice: Subject to any disclaimer, the term of this patent is extended or adjusted under 35 U.S.C. 154(b) by 0 days.

(21) Appl. No.: 13/407,664

(22) Filed: Feb. 28, 2012

(65) Prior Publication Data

US 2012/0218118 A1    Aug. 30, 2012

Related U.S. Application Data

(63) Continuation-in-part of application No. 12/555,737, filed on Sep. 8, 2009.

(60) Provisional application No. 61/450,073, filed on Mar. 7, 2011, provisional application No. 61/180,779, filed on May 22, 2009, provisional application No. 61/186,748, filed on Jun. 12, 2009.

(51) Int. Cl.
*G01V 3/00* (2006.01)

(52) U.S. Cl. .................. 340/856.3; 166/254.2

(58) Field of Classification Search ..... 340/856.4 856.3, 340/853.2; 166/301
See application file for complete search history.

(56) References Cited

U.S. PATENT DOCUMENTS

| | | | |
|---|---|---|---|
| 3,803,387 A | 4/1974 | Lackowski | |
| 5,053,784 A | 10/1991 | Hippelainen | |
| 5,534,875 A | 7/1996 | Diefes et al. | |
| 5,617,317 A | 4/1997 | Ignagni | |
| 6,543,256 B1 * | 4/2003 | Taru et al. | 65/407 |
| 6,543,536 B2 | 4/2003 | Dewey et al. | |
| 6,766,253 B2 * | 7/2004 | Burns et al. | 702/6 |
| 7,363,967 B2 | 4/2008 | Burris, II et al. | |
| 7,669,656 B2 * | 3/2010 | Wright et al. | 166/254.2 |
| 7,798,216 B2 * | 9/2010 | Phillips et al. | 166/254.2 |
| 7,894,297 B2 * | 2/2011 | Nutt et al. | 367/25 |

(Continued)

FOREIGN PATENT DOCUMENTS

| | | |
|---|---|---|
| WO | WO 99/58933 | 11/1999 |
| WO | WO 02/50400 | 6/2002 |

OTHER PUBLICATIONS

European Search Report in European Application No. 10152513.7, dated Jul. 7, 2012 in 6 pages.

(Continued)

*Primary Examiner* — Peguy Jean Pierre
(74) *Attorney, Agent, or Firm* — Knobbe, Martens, Olson & Bear, LLP

(57) ABSTRACT

A method and an apparatus are provided for determining an orientation of a wellbore survey tool at a first position with respect to a reference direction. At least one first signal is indicative of an orientation of a directional reference system with respect to the reference direction. The directional reference system is positioned at a second position spaced from the first position. At least one second signal is indicative of a relative orientation of the wellbore survey tool with respect to the directional reference system. The orientation of the wellbore survey tool at the first position is determined in response at least in part to the at least one first signal and the at least one second signal.

26 Claims, 25 Drawing Sheets

U.S. PATENT DOCUMENTS

| | | |
|---|---|---|
| 8,089,390 B2 * | 1/2012 | Jones et al. .................... 342/22 |
| 2005/0183887 A1 | 8/2005 | Rodney |
| 2009/0070058 A1 | 3/2009 | Lin |
| 2009/0089001 A1 | 4/2009 | Lin |

OTHER PUBLICATIONS

"FLEXIT HTGS: High Temperature GyroSmart", www.flexit.se, 2009 Brochure in 2 pages, printed Sep. 8, 2009.

* cited by examiner

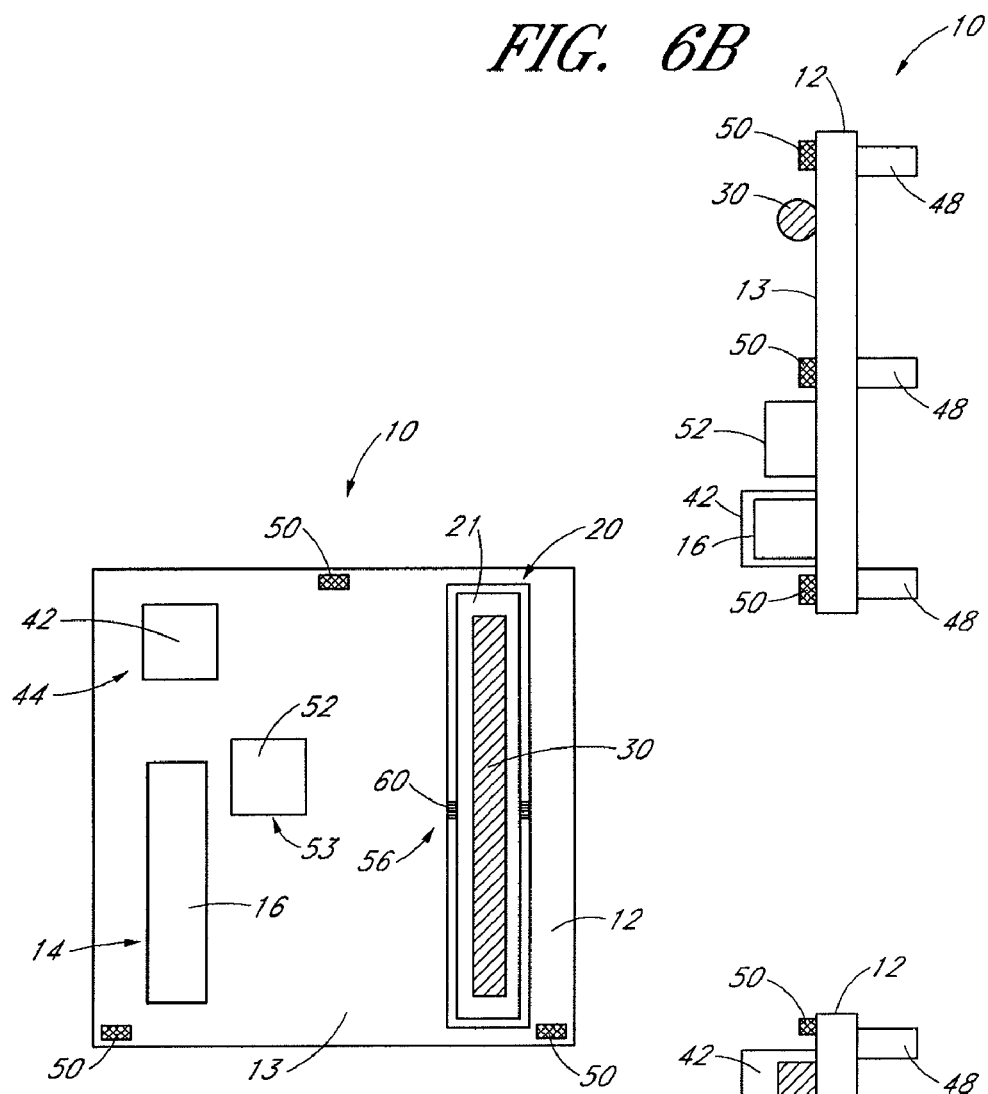
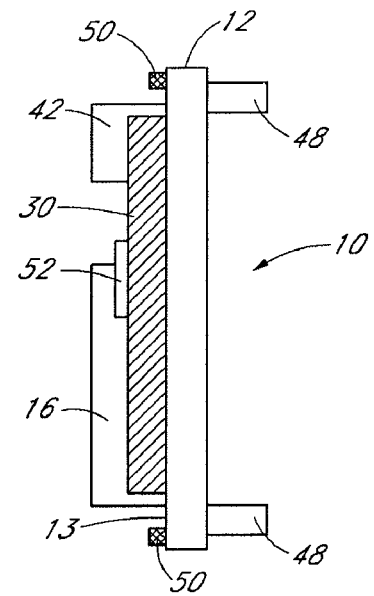
FIG. 6B
FIG. 6A
FIG. 6C

METHOD AND APPARATUS FOR INITIALIZATION OF A WELLBORE SURVEY TOOL VIA A REMOTE REFERENCE SOURCE

CROSS-REFERENCE TO RELATED APPLICATIONS

This application is a continuation-in-part of U.S. patent application Ser. No. 12/555,737, filed Sep. 8, 2009 and incorporated in its entirety by reference herein, which claims the benefit of priority from U.S. Provisional Appl. Nos. 61/180,779 filed May 22, 2009 and 61/186,748 filed Jun. 12, 2009, both of which are incorporated in their entirety by reference herein. This application also claims the benefit of priority from U.S. Provisional Appl. No. 61/450,073 filed Mar. 7, 2011, which is incorporated in its entirety by reference herein.

BACKGROUND

1. Field

The present application relates generally to methods and apparatus for initialization of a wellbore survey tool.

2. Description of the Related Art

There are typically two types of surveying by which wellbore survey tools conduct surveys (e.g., gyroscopic- or gyro-based surveys) of wellbores. The first type is static surveying, in which measurements of the Earth's rotation are taken at discrete depth intervals along the well trajectory. These measurements can be used to determine the orientation of the survey tool with respect to a reference vector, such as the vector defined by the horizontal component of the Earth's rate in the direction of the axis of the Earth's rotation; a process also referred to herein as gyro-compassing. The second type is continuous surveying, in which the gyroscopic or gyro measurements are used to determine the change in orientation of the survey tool as it traverses the well trajectory. This process uses the gyro measurements of turn rate with respect to a known start position. The start position may be derived, for example, by conducting a static survey prior to entering the continuous survey mode (which may also be referred to as an autonomous or autonomous/continuous survey mode).

Under certain circumstances, static surveying generally becomes less accurate than in other circumstances. For example, when operating at high latitudes on the Earth's surface the static survey process becomes less accurate than at low latitudes. At relatively high latitudes, the reference vector to which the survey tool aligns itself during the gyro-compassing procedure, the horizontal component of Earth's rate ($\Omega_H$), is small compared to the value in equatorial and mid-latitude regions, as indicated by the following equation:

$$\Omega_H = \Omega \cos L, \qquad \text{(Eq. 1)}$$

where $\Omega$=Earth's rate and L=latitude. Generally, a satisfactory directional survey can be achieved using gyro-compassing at latitudes of up to about 60 degrees. However, the accuracy can degrade rapidly thereafter as the cosine of latitude reduces more rapidly and the magnitude of $\Omega_H$ thus becomes much smaller. FIG. 1 schematically illustrates the horizontal component $\Omega_H$ of the Earth's rate for changing latitude. As shown, at zero latitude $\Omega_H$ is at its maximum value and is equal to the Earth's rate (a). $\Omega_H$ successively decreases to $\Omega_H = \Omega \cos L_1$ and $\Omega_H = \Omega \cos L_2$ for increasing latitudes $L_1$ and $L_2$, respectively, and $\Omega_H$ is zero at 90 degrees of latitude (i.e., at the North Pole). There is a significant amount of oil and gas exploration at relatively high latitudes (e.g., latitudes in excess of 70 degrees). At these latitudes, the accuracy of well surveys based on gyro-compassing can be degraded. Similar degradations in survey accuracy can also occur when using magnetic survey tools instead of, or in addition to, gyro-based survey tools. As such, survey accuracy may similarly decrease at locations close to the Earth's magnetic poles when using magnetic survey tools.

In addition, the accuracy of gyro-compassing can be degraded when conducted from a moving platform (e.g., an offshore platform), as compared to being conducted from a relatively static platform. For example, during operation from a moving platform, the survey tool will be subjected to platform rotational motion in addition to the Earth's rotation. Under such conditions, tool orientation with respect to the horizontal Earth's rate vector ($\Omega_H$) may be difficult to determine with the precision that is possible on a stationary platform since the directional reference, defined by $\Omega_H$ is effectively corrupted by the platform motion.

SUMMARY

In certain embodiments, a method is provided for determining an orientation of a wellbore survey tool at a first position with respect to a reference direction. The method comprises receiving at least one first signal indicative of an orientation of a directional reference system with respect to the reference direction. The directional reference system is positioned at a second position spaced from the first position. The method further comprises receiving at least one second signal indicative of a relative orientation of the wellbore survey tool with respect to the directional reference system. The method further comprises determining the orientation of the wellbore survey tool at the first position in response at least in part to the at least one first signal and the at least one second signal.

In certain embodiments, a system for determining an orientation of a wellbore survey tool is provided. The system comprises one or more computer processors. The system further comprise one or more inputs configured to receive data indicative of an orientation of a directional reference system with respect to a reference direction and data indicative of a relative orientation of the wellbore survey tool with respect to the directional reference system. The direction reference system is positioned at a first position relative to a wellbore entrance and a wellbore survey tool is mounted at a second position relative to the wellbore entrance spaced away from the first position. The system further comprises a wellbore initialization module executing in the one or more computer processors and configured to, in response at least in part to the received data, calculate an orientation of the survey tool.

In certain embodiments, a system for use in determining an orientation of a wellbore survey tool is provided. The system comprises at least one directional reference system configured to provide data indicative of an orientation of the at least one directional reference system with respect to a reference direction. The system further comprise an optical component mounted at a predetermined orientation with respect to the directional reference system and configured to transmit light along a line extending between the directional reference system and a first reflecting surface mounted at a predetermined orientation with respect to the wellbore survey tool.

BRIEF DESCRIPTION OF THE DRAWINGS

FIGS. 6A-6C schematically illustrate top, front and right side views, respectively, of an apparatus including a tool positioning element in accordance with certain embodiments herein.

DETAILED DESCRIPTION

Figure 1:
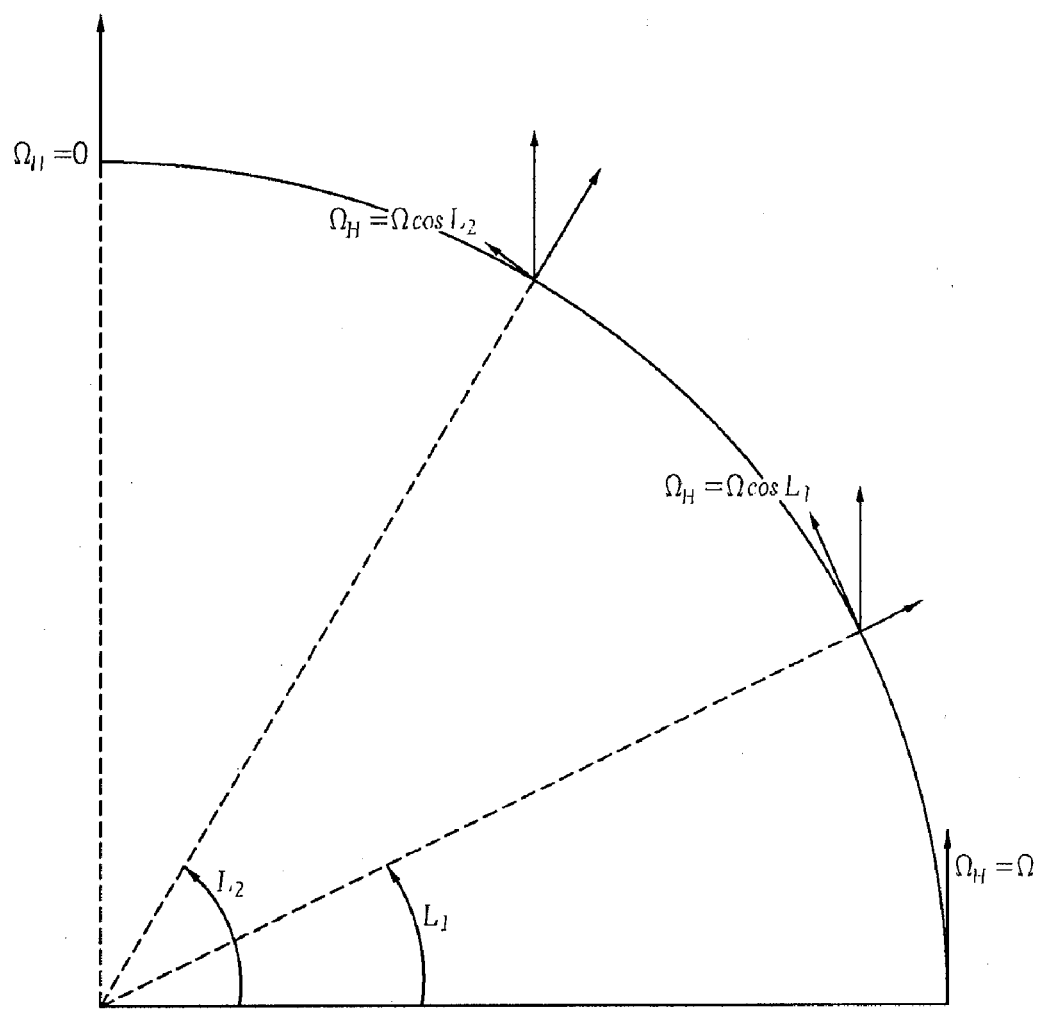
FIG. 1 schematically illustrates the horizontal component of the Earth's rate for changing latitude.

Embodiments described herein provide systems and methods which generally allow precision well surveys to be conducted at high latitude locations, from a moving surface (e.g., an off-shore moving platform), or both.

A. Overview

While underground, gyro survey tools generally rely upon gyro-compassing to conduct a static survey and/or to initiate a period of continuous surveying to determine the orientation of the survey tool with respect to a reference vector (e.g., the vector defined by the horizontal component of the Earth's rate). However, at the surface, there are other procedures which may be adopted. For example, land surveying techniques can be used to define a reference direction (which may also be referred to as a "benchmark direction") to which the tool can be aligned. This process may be referred to as foresighting.

Alternatively, measurements from a directional reference system, such as a satellite navigation system, may be used to determine the orientation (e.g., the attitude) of a survey tool with respect to a known geographic reference frame. The Global Positioning System (GPS) or the equivalent system developed by the former Soviet Union, the Global Navigation Satellite System (GLONASS), may be used, for example. Systems exist which use measurements of the differences in carrier wave phase between two or more receiving antennae spaced a known distance apart to determine the attitude of the body or vehicle on which the antennae are mounted. Examples of such systems are described, for example, in U.S. Pat. No. 5,534,875, entitled "Attitude Determining System for Use with Global Positioning System", which is incorporated in its entirety by reference herein. These systems provide world-wide measurement of position, velocity and attitude on and above the surface of the Earth and are substantially immune to magnetic deviations and anomalies.

Using such systems in accordance with certain embodiments described herein, the initial orientation (e.g., attitude) of a survey tool may thus be defined accurately while above ground (e.g., on the surface) and data indicative of the initial orientation (e.g., attitude data) can then be transferred to the tool. In certain circumstances, the survey tool may then be switched to continuous survey mode prior to being positioned for insertion into the wellbore and/or prior to insertion into the wellbore. For example, the initial orientation of the tool may be measured prior to pick-up of the survey tool (e.g., from horizontal to vertical with respect to the wellbore) to position the survey tool into the wellbore. In certain embodiments, this initial measurement may be made while the tool is positioned generally horizontally with respect to the wellbore (e.g., laying on a surface in the vicinity of the wellbore), for example.

The survey tool may be switched to continuous mode such that its subsequent orientation (e.g., heading, trajectory, attitude, azimuth, etc.) can be measured with respect to the initial orientation. The survey tool may then be lifted from the horizontal position to another position, such as a vertical position. A continuous survey of the wellbore may then be conducted as the survey tool traverses the well trajectory.

Both land surveying techniques and methods using satellite navigation techniques for determining an initial orientation of the survey tool are susceptible to human errors under certain conditions. For example, the tool may be picked up relatively rapidly and one or more of the sensors keeping track of the orientation of the tool (e.g., in continuous survey mode) may become saturated or otherwise reach their rate limits. In addition, the tool may be dropped in some cases. Certain embodiments described herein address such problems by linking a survey/GPS reference with an inertial system in the survey tool through a semi-automated or automated process that can operate both at high latitude and on a moving surface (e.g., a moving off-shore drilling rig). For example, some embodiments enable the movement of a wellbore tool in a controlled manner (e.g., at a controlled rate) with respect to the wellbore (e.g., through an automated or semi-automated process) and while the tool is in continuous mode after determining an initial orientation (e.g., using a GPS system).

In general, a wellbore survey tool (e.g., a gyro survey tool) may be operated under at least the following categories of conditions:

(1) Operation from a fixed, non-moving platform at limited borehole inclination. In such conditions, for example, one approach is to use a two axis (xy) gyro system to conduct static gyro-compassing surveys. In addition, continuous surveys may be initiated (e.g., using gyro-compassing) and conducted over the whole, or sections, of the wellbore.

(2) Operation in high inclination boreholes from a fixed platform. Under these conditions, for example, one approach is to use a three axis (xyz) gyro system to conduct static gyro-compassing surveys. In addition, continuous surveys may be initiated (e.g., using gyro-compassing) and conducted over the whole, or sections, of the wellbore.

(3) Operation at high latitude from a fixed platform. Here, continuous surveys may be used as the survey tool passes along the wellbore. The survey may be initiated (e.g., an initial orientation may be determined), at the surface using techniques described herein (e.g., using satellite navigation such as GPS) in accordance with embodiments herein. In certain embodiments, satellite navigation techniques may be used in conjunction with an inertial navigation system (INS) (e.g., a joint GPS/INS system, or a stand alone inertial navigation system) which can address issues such as satellite signal non-availability or shielding described herein.

(4) Operation on or from a moving surface (e.g., on or from an off-shore drilling rig). In such conditions, and in accordance with embodiments described herein, continuous surveys may be used throughout the wellbore. The survey may be initiated (e.g., an initial orientation may be determined) at the surface using satellite navigation. In certain embodiments, satellite navigation techniques may be used in conjunction with an inertial navigation system (INS) (e.g., a joint GPS/INS system, or a stand alone inertial navigation system) which can address issues such as satellite signal non-availability or shielding as described herein, and to aid transfer of satellite reference data to the survey tool. Angular matching techniques described herein may also be used to improve the accuracy of the survey.

In certain embodiments, an apparatus (e.g., a rigid platform structure) is configured to be attached to a wellbore surveying tool and to be moved between multiple positions on a drilling rig. The apparatus can be configured to allow for accurate initialization of the survey measurement system within the wellbore survey tool. The apparatus may be configured to enable the transfer of relatively precise orientation (e.g., attitude and/or azimuth) data to a directional survey system in the wellbore survey tool for drilling operations, such as drilling operations at high latitude locations on the Earth, or when operating off-shore from a moving drilling rig.

Certain embodiments described herein provide a relatively precise determination of the orientation of a wellbore survey tool (e.g., attitude, azimuth and/or heading reference) at the surface which does not use gyro-compassing. In certain embodiments, this orientation information may be transferred to an inertial system in the survey tool. This technique can be performed by devices that generally operate independently of the instrumentation and equipment within the survey tool. This independent orientation determination may be performed, for example, based on established land surveying methods (e.g., fore-sighting) or the use of satellite based information (e.g., using GPS technology), and/or using inertial navigation systems (e.g., using an attitude and heading reference system (AHRS) unit). Once the orientation (e.g., attitude and/or azimuth) data is transmitted to the survey tool, a continuous survey procedure can be initiated which involves the integration of gyro measurements as the survey tool is placed in a bore-hole and as it traverses the well path. This continuous surveying process is generally initiated or initialized by the orientation data (e.g., attitude, azimuth, and/or heading data) derived at the surface.

To enable these functions while avoiding potential problems that can occur when surveying underground bore-holes, apparatus (e.g., platform structures) as described herein can be moved to a drilling rig generally anywhere in the world where it can be set up to accommodate the various items of equipment used to perform the orientation determination (e.g., attitude, azimuth and/or heading reference determination). These apparatus may comprise rigid platform structures, be of relatively low weight, and may be capable of being mounted generally rigidly on the drilling rig at a location(s) alongside or close to the well head.

The apparatus described herein can include fixturing (e.g., one or more mounts) to allow both independent surface reference equipment (e.g., a directional reference system such as a GPS receiver with two or more antennae) and the survey tool to be mounted (e.g., relatively rigidly) on or within the apparatus. In certain embodiments, the apparatus can be leveled and the orientation of the survey tool can be aligned relatively precisely to a reference direction defined on the platform by the surface reference equipment (e.g., defined by the relative positioning of two or more antennae in the case of a GPS reference). In one embodiment, a GPS receiver is capable of determining the direction of the line joining two antennae of the GPS receiver with respect to true north. In this situation, the azimuth angle defined by the GPS (e.g., the angle of the line joining the two antennae with respect to true north) can be transferred to the survey tool. Inclination and tool-face angle of the survey tool can additionally be determined based on measurements provided by the survey tool (e.g., by one or more accelerometers within the survey tool). The initial orientation (e.g., azimuth, inclination and tool-face angles) can be thereby determined and used to initialize the subsequent integration process (e.g., during continuous surveying) that can be implemented within the tool for keeping track of bore-hole direction as the tool moves along its trajectory. In general, the orientation information can be made available independent or regardless of the latitude of the drilling platform.

B. Initialization of the Survey Tool at High Latitudes

Figure 2:
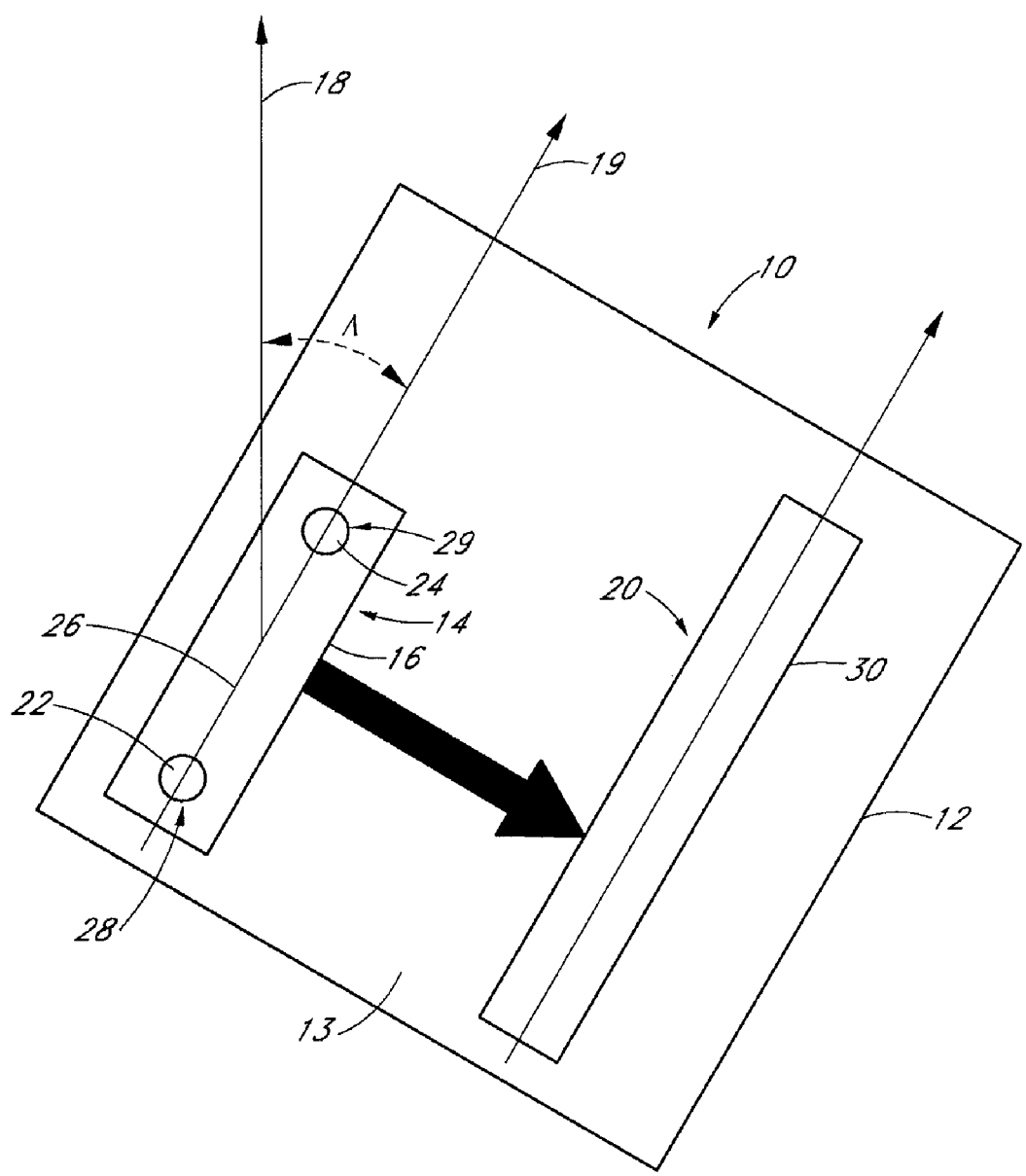
FIG. 2 schematically illustrates an example apparatus for initializing a wellbore survey tool in accordance with certain embodiments described herein.

FIG. 2 schematically illustrates an example apparatus 10 for initializing a wellbore survey tool 30 in accordance with certain embodiments described herein. In certain embodiments, the apparatus 10 comprises a base portion 12 and a first mounting portion 14 mechanically coupled to the base portion 12. The first mounting portion 14 of certain embodiments is adapted to be mechanically coupled to at least one directional reference system 16. The at least one directional reference system 16 can be configured to provide data indicative of an orientation (e.g., attitude and/or azimuth) of the at least one directional reference system 16 with respect to a reference direction 18. The reference direction 18 may be north (e.g., true or rotational north or magnetic north). In certain embodiments, the apparatus 10 further comprises a second mounting portion 20 mechanically coupled to the base portion 12. The second mounting portion 20 may be configured to be mechanically coupled to the wellbore survey tool 30 such that the wellbore survey tool 30 has a predetermined orientation with respect to the at least one directional reference system 16. For example, as shown in FIG. 2, the survey tool 30 may be substantially parallel to the directional reference system 16. In other embodiments, the survey tool 30 may be oriented at some predetermined angle relative to the directional reference system 16, or may be oriented in some other predetermined fashion with respect to the directional reference system 16.

As shown in FIG. 2, the base portion 12 may comprise a substantially rigid, generally rectangular platform structure including a generally planar surface 13. In other embodiments, the base portion 12 may have a different shape (e.g., circular, ovular, trapezoidal, etc.), may be somewhat flexible, and/or may include one or more inclined surfaces, declined surfaces, stepped portions, etc.

In certain embodiments, the base portion 12 comprises carbon fiber. In other configurations, the base portion 12 may comprise another material such as steel, other metal, or a polymer or plastic material. In certain embodiments, the first mounting portion 14 comprises an area of the base portion 12 on which the directional reference system 16 can be mounted. In some embodiments, the first mounting portion 14 comprises one or more fixtures (e.g., mounting faces or blocks) or cut-outs into which the directional reference system 16 may be fitted. In various embodiments, the directional reference system 16 is releasably secured to the first mounting portion 14. For example, the first mounting portion 14 may include one or more straps, clamps, snaps, latches, threaded posts or sockets, etc., for mounting the directional reference system 16. In addition, the directional reference system 16 may include one or more mounting features which are configured to be coupled to corresponding mating features on the first mounting portion 14. In other embodiments, the directional reference system 16 and the first mounting portion 14 may be generally permanently coupled (e.g., welded or glued together). In certain configurations, the first mounting portion 14 comprises or forms a part of a shelf structure which is mounted on or above the base portion 12.

The first mounting portion 14 may also include one or more ports (not shown) (e.g., electrical ports) for operatively coupling the directional reference system 16 to the apparatus 10. For example, the ports may enable electrical communication between the directional reference system 16 and the apparatus 10 or components thereof. In certain other embodiments, the directional reference system 16 is not in direct communication with or otherwise operatively coupled to the apparatus 10 but is in communication with one or more systems or subsystems physically separate from the apparatus 10. Such systems or subsystems may themselves be in communication with the apparatus 10 or components thereof.

In certain embodiments, the at least one directional reference system 16 comprises at least one signal receiver of a global positioning system (GPS). For example, the at least one signal receiver may comprise a first antenna 22 and a second antenna 24 spaced apart from the first antenna 22. In certain such embodiments, the first antenna 22 and the second antenna 24 define a line 26 from the first antenna 22 to the second antenna 24. In certain embodiments more than two antennae may be used. In certain embodiments, the at least one signal receiver further comprises a processor (not shown) configured to receive signals from the first and second antennae 22, 24 and to determine an orientation of the line 26 with respect to the reference direction 18. For example, the processor may be configured to determine an attitude or azimuth of the directional reference system 16 with respect to the reference direction 18. In certain embodiments, the attitude or azimuth determination is relatively precise. For example, the determination can be within about 0.2 degrees in some embodiments. In other embodiments the determination may be more or less precise. In certain embodiments, the first mounting portion 14 comprises a first antenna mount 28 to be mechanically coupled to the first antenna 22 and a second antenna mount 29 to be mechanically coupled to the second antenna 24.

In certain other embodiments, the at least one signal receiver may be a non-GPS signal receiver. For example, the at least one signal receiver may be a signal receiver of another satellite navigation system (e.g., GLONASS), or some non-satellite based navigation or positioning system. As shown, the directional reference system 16, the components thereof, and the base portion 12 may form one physically integral unit (e.g., the generally rectangular unit of FIG. 2). In certain other embodiments, the directional reference system 16 comprises one or more physically separate units, each independently mounted on the base portion 12. For example, in one embodiment, the first antenna 22 forms a first unit to be mounted to the first antenna mount 28 and the second antenna 24 forms a second unit to be mounted to the second antennae mount 29 and physically separate from the first unit.

In some embodiments, surveying methods (e.g., optical sighting methods such as fore-sighting) may be used an alternative method of defining determining or defining the orientation of the platform or a line on the platform with respect to the reference direction 18. In such embodiments, a directional reference system 16 may not be employed and another device, such as a sighting or other surveying device, for example, may be used to determine the orientation (e.g., the direction 19 of the apparatus 10) of the platform or a line thereon (e.g., a line corresponding to the direction 19 of the apparatus 10) with respect to the reference direction 18. Land-surveying techniques (e.g., fore-sighting) may thus be used to determine an initial orientation (e.g., attitude and/or azimuth) of the apparatus 10 or a portion thereof with respect to the reference direction 18. In certain embodiments, the orientation may be determined by optically sighting to a reference object or point at a known location with respect to the location of the apparatus 10 (e.g., an oil rig location). The first mounting portion 14 of such embodiments may be configured to receive and accommodate the surveying device (e.g., a sighting device). The first mounting portion 14 may comprise features described above with respect to FIG. 2, for example (e.g., one or more cut-outs, clamps, snaps, latches, threaded posts or sockets, etc.), but such features are generally configured to mount the surveying device instead of the directional reference system 16. Data indicative of the initial orientation of the platform (e.g., the direction 19 of the platform with respect to the reference direction 18) may then be transmitted to the survey tool 30. In one embodiment, the data may be manually entered by an operator into a computing system in communication with the survey tool 30 and then be transmitted to the tool 30 (e.g., wirelessly). Because the survey tool 30 of certain embodiments is mounted in a predetermined orientation with respect to the apparatus 10 (e.g., parallel with the apparatus 10), the orientation of the survey tool 30 can be determined in accordance with embodiments described herein.

The second mounting portion 20 of certain embodiments comprises an area of the base portion 12 on which the survey tool 30 is mounted. For example, the second mounting portion 20 may comprise the area or surface 21 of the base portion 12. In some embodiments, the second mounting portion 20 comprises one or more fixtures or cut-outs into which the survey tool 30 may be fitted. In various embodiments, the survey tool 30 is releasably secured to the second mounting portion 20. In certain embodiments, the second mounting portion 20 comprises one or more mounting faces or blocks. For example, the mounting faces may be similar to the mounting faces 46 and can extend from the base portion 12 and be positioned on the apparatus 10 such that the survey tool 30 abuts against one or more surfaces of the mounting faces, thereby securing and/or limiting the movement of the survey tool 30 along the base portion 12 in one or more directions. The mounting faces may comprise blocks (e.g., rectangular, cylindrical, triangular, etc. shaped blocks), sheets, and the like. In certain embodiments, the first mounting portion 14, the third mounting portion 44 (FIG. 4), and/or the fourth mounting portion 53 (FIG. 4) can comprise mounting faces similar to the mounting faces 46 of the second mounting portion 20 and which are configured to secure and/or limit the movement of the directional reference system 16, the inertial navigation system 42, and the computing system 52, respectively. The apparatus 10 of FIG. 4 includes mounting faces 46 on one side of the survey tool 30. Other configurations are possible. For example, in one embodiment, there are mounting faces 46 on the opposite side of the survey tool 30 and/or on each end of the survey tool 30.

In various embodiments, the second mounting portion 20 may include one or more straps, clamps, snaps, latches, threaded posts or sockets, etc., for mounting the survey tool 30. In addition, the survey tool 30 may include one or more mating features configured to be coupled to corresponding mating features on the second mounting portion 20. In some embodiments, the second mounting portion 20 comprises one or more securing elements (e.g., straps, clamps, etc.) positioned along the casing of the survey tool 30 when the survey tool 30 is mounted. In certain embodiments, the securing elements are positioned along one or both of the long sides of the casing of the survey tool 30, at one or both of the two ends of the casing of survey tool 30, or a combination thereof. In various other embodiments, the securing elements are positioned along only one side, along one or more of the ends of the casing of the survey tool 30, or beneath or above the casing of the survey tool 30. In certain embodiments, the second mounting portion 20 comprises or forms a part of a shelf structure which is mounted on or above the base portion 12. For example, in one embodiment, the first mounting portion 14 and the second mounting portion 20 each comprise separate shelf structures and form a multi-leveled shelf structure on or over the base portion 12.

The second mounting portion 20 may also include one or more ports (e.g., electrical ports) for operatively coupling the survey tool 30 to the apparatus 10. For example, the ports may enable electrical communication between the survey tool 30 and the apparatus 10 or components thereof. In certain other embodiments, the survey tool 30 is not in direct communication or otherwise operatively coupled to the apparatus 10, but is in communication with one or more systems or subsystems physically separate from the apparatus 10. Such systems or subsystems may themselves be in communication with the apparatus 10 or components thereof.

The survey tool 30 of certain embodiments can comprises various sensors and computing hardware such that it can make use of various measured quantities such as one or more of acceleration, magnetic field, and angular rate to determine the orientation of the survey tool 30 and of the wellbore with respect to a reference vector such as the Earth's gravitational field, magnetic field, or rotation vector. In certain embodiments, the survey tool 30 is a dedicated survey instrument while, in other embodiments, the survey tool 30 is a measurement while drilling (MWD) or logging while drilling (LWD) instrumentation pack which may be coupled to a rotary steerable drilling tool, for example.

Because the line 26 between the two antennae 22, 24 may be generally aligned with a direction 19 of the apparatus 10, or the orientation of the line 26 with respect to the apparatus 10 may otherwise be known, the line 26 may define, correspond to, or be used as the orientation (e.g., direction 19) of the apparatus 10 with respect to the reference direction 18. In FIG. 2, for example, the line 26 is shown rotated with respect to the reference direction 18 (e.g., true north) by angle A. The angle A may define or be characterized as the angle (e.g., azimuth angle) of the apparatus 10 with respect to the reference direction 18. Moreover, because the survey tool 30 can be aligned with respect to the line 26, the angle A can therefore also correspond to the direction (e.g., azimuth direction) of the survey tool 30 with respect to the reference direction 18. The angle A can thus be transmitted (e.g., as electronic data) to the survey tool 30 for the initialization of the survey tool 30.

Figure 3:
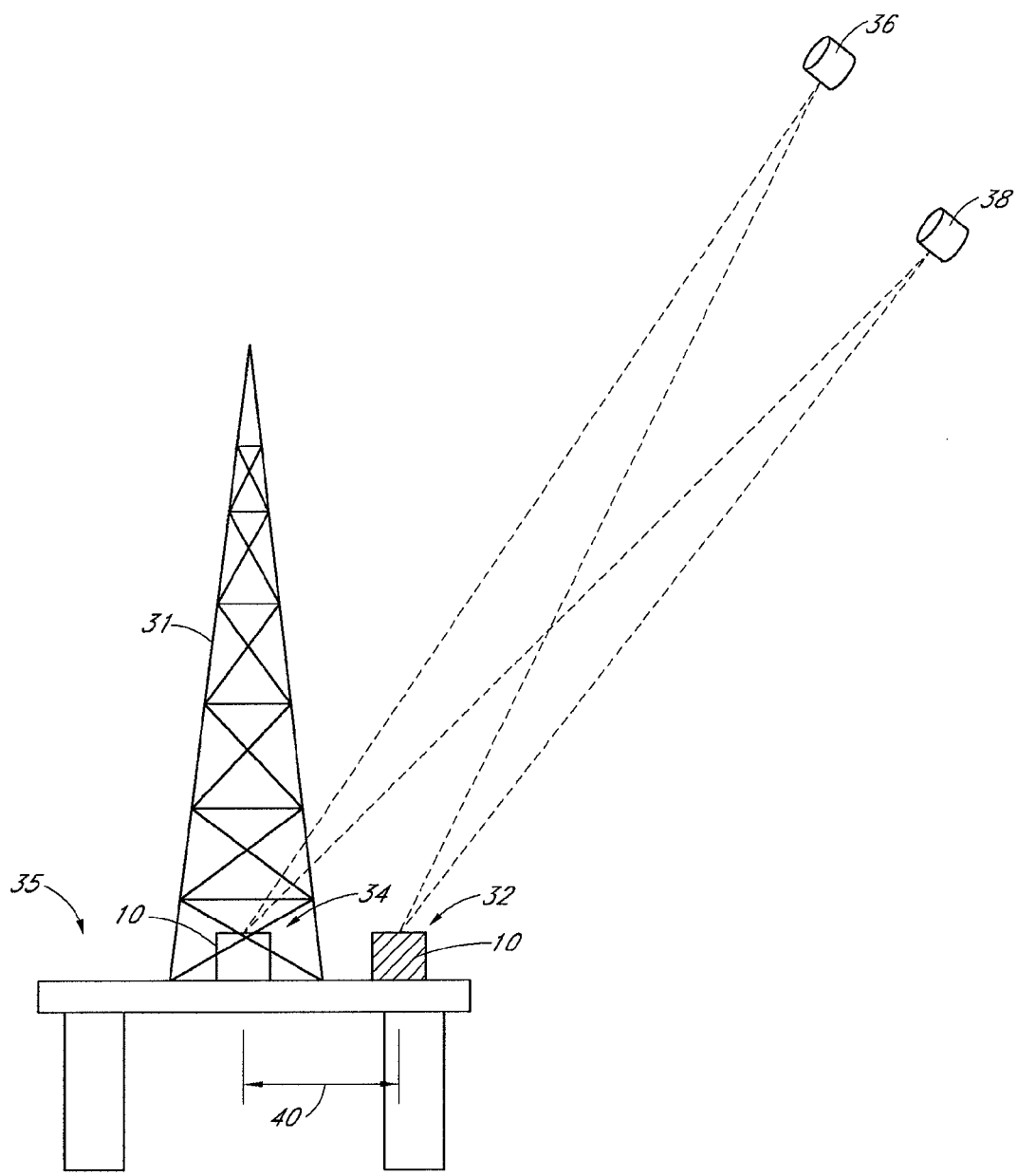
FIG. 3 schematically illustrates apparatus according to certain embodiments described herein in a first location in which a relatively clear communication path between GPS antennae of the apparatus and GPS satellites, and in a second location in which the GPS antennae are at least partially shielded from communication with GPS satellites by a derrick.

Loss of satellite telemetry to and/or detected by the directional reference system 16 can arise in some conditions. Such loss can occur, for example, due to shielding of one or more of the GPS antennae from one or more of the satellites by a derrick or other equipment on a rig. In addition, relatively unfavorable positioning of the satellites that are in view of the platform can lead to a loss of precision in the orientation (e.g., attitude and/or azimuth) determination process. This loss of precision may be referred to as the geometric dilution of precision, for example. FIG. 3 schematically illustrates the apparatus 10 according to certain embodiments described herein in a first location 32 on a drilling rig 35 having a relatively clear communication path between the antennae 22, 24 and the GPS satellites 36, 38, and in a second location 34 at which one or more of the antennae 22, 24 are shielded from communication with one or more GPS satellites 36, 38 by the derrick 31. As illustrated by the dotted lines, the apparatus 10 to which the survey tool 30 is to be mounted for initialization is in clear view of the satellites 36, 38 in the first location 32 when spaced from the derrick 31 by a first distance 40. As such, a relatively clear communication path may exist between the antennae 22, 24 and the satellites 36, 38. On the other hand, when located directly under the derrick 31 in the second position 34, the derrick 31 may block or otherwise interfere with communications from the satellites 36, 38 to the antennae 22, 24, and there may no longer be a relatively clear communication path between the antennae 22, 24 and the satellites 36, 38. As such, satellite telemetry to and/or detected by the directional reference system 16 may be interrupted. In the example configuration of FIG. 3, communications from the satellites 36, 38 to the antennae may be similarly interrupted when the apparatus 10 is in other positions, such as when the apparatus 10 is positioned to the left of the derrick 31. The distance 40 may generally be selected so as to ensure a relatively clear communication path between the antennae 22, 24 and the satellites 36, 38. For example, the distance 40 may range from 5 to 10 meters in certain embodiments. In other embodiments, the distance 40 can be less than 5 meters or greater than 10 meters.

It can be beneficial to have the capability to move the apparatus 10 (e.g., along the surface of a rig) between the first location 32 where the effect of signal shielding is small (e.g., where the apparatus 10 is spaced apart from the drilling derrick 31) and the second location 34, where the survey tool 30 may be inserted into the wellbore but where the satellite telemetry may be compromised. In certain embodiments, an orientation of the directional reference system 16 and/or survey tool 30 may be accurately obtained at the first location 32 without substantial obstruction or other interference from the derrick 31, or from other sources. In addition, it is desirable to be able to keep track of the relative orientation of the apparatus 10 or components thereof as it moves from the first location 32 to the second location 34. As such, deviations from the at the first location 32 may be tracked while the apparatus 10 is moved to the second location 34, thereby maintaining an up-to-date orientation (e.g., attitude, azimuth, and/or heading) of the apparatus and components thereof during movement. As described herein, an inertial navigation system may be used for such purposes.

Figure 4:
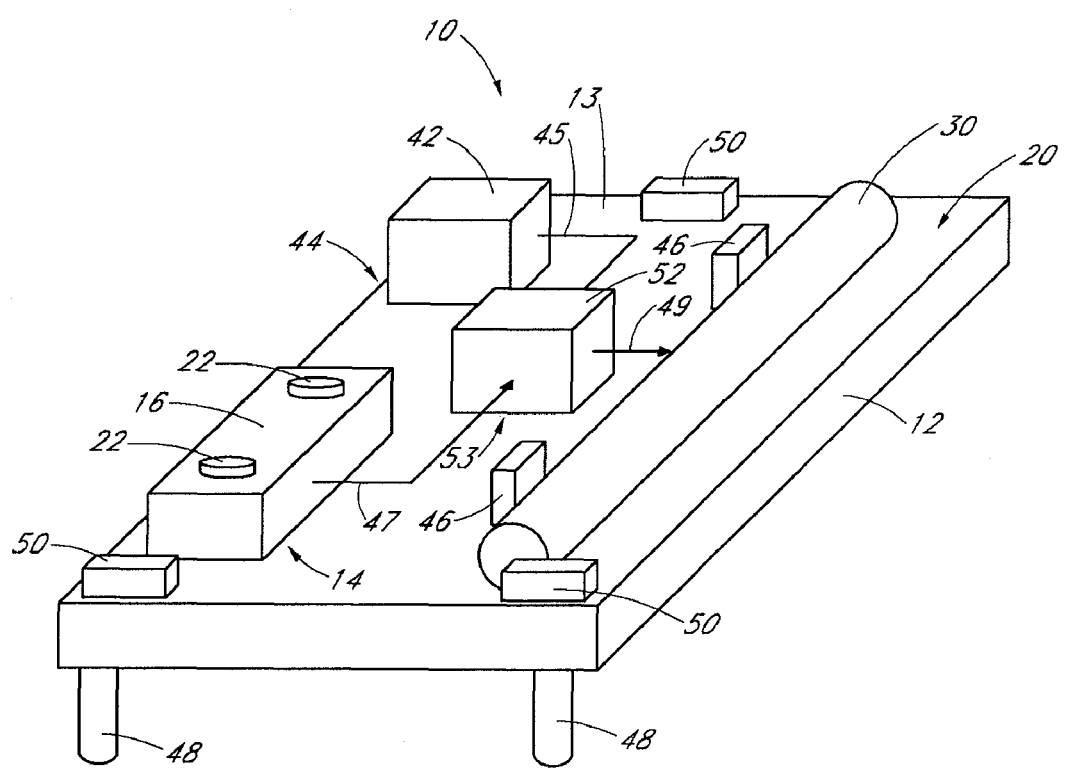
FIG. 4 schematically illustrates another example apparatus in accordance with certain embodiments described herein.

FIG. 4 schematically illustrates an example apparatus 10 in accordance with certain embodiments described herein. The apparatus 10 of certain embodiments includes a third mounting portion 44 mechanically coupled to the base portion 12. The third mounting portion 44 is configured to be mechanically coupled to at least one inertial navigation system 42. In certain embodiments, the third mounting portion 44 comprises an area of the base portion 12 on which the inertial navigation system 42 is mounted. In some embodiments, the third mounting portion 44 comprises one or more fixtures or cut-outs into which the inertial navigation system 42 may be fitted. In various embodiments, the inertial navigation system 42 is releasably secured to the third mounting portion 44. For example, the third mounting portion 44 may include one or more straps, clamps, snaps, latches, or threads, etc. for mounting the inertial navigation system 42. In addition, the inertial navigation system 42 may include one or more mating features configured to be coupled to corresponding mating features on the third mounting portion 44. In other embodiments, the inertial navigation system 42 and the third mounting portion 44 may be generally permanently coupled (e.g., welded or glued together). In certain embodiments, the third mounting portion 44 comprises or forms a part of a shelf structure which is mounted on or above the base portion 12. For example, in one embodiment, the third mounting portion 44 and one or more of the first mounting portion 14 and the second mounting portion 20 may each comprise separate shelves and form a multi-leveled shelf structure on or over the base portion 12.

The third mounting portion 44 may also include one or more ports (e.g., electrical ports) for operatively coupling the inertial navigation system 42 to the apparatus 10. For example, the ports may enable electrical communication between the inertial navigation system 42 and the apparatus 10 or components thereof. In certain other embodiments, the inertial navigation system 42 is not in direct communication or otherwise operatively coupled to the apparatus 10, but is in communication with one or more systems or subsystems physically separate from the apparatus 10. Such systems or subsystems may themselves be in communication with the apparatus 10 or components thereof.

The inertial navigation system 42 generally provides the capability of maintaining the heading or orientation information obtained at the first location 32 while the apparatus 10 is moved from the first location 32 (e.g., on a rig from the first location 32 to the second location 34). The inertial navigation system 42 may comprise an attitude and heading reference system (AHRS), for example, and may be used to keep track of the orientation of the apparatus 10 and components thereon (e.g., attitude and/or azimuth) during movement of the apparatus 10 (e.g., from the first location 32 to the second location 34 of FIG. 3). For example, the inertial navigation system 42 may keep track of the orientation (e.g., attitude, azimuth, and/or heading) during movement of the apparatus 10 should the performance of the directional reference system 16 become compromised (e.g., the antennae of a GPS system are obscured from the satellite by the derrick 31 on a rig) or cannot be used to determine the orientation of the apparatus at the well head of the wellbore. In other embodiments, other types of inertial navigation systems, such as a full inertial navigation system (INS) may be used. In some embodiments, the directional reference system 16 or components thereof and the inertial navigation system 42 may be integrated into a single unit (e.g., a GPS/AHRS unit).

Figure 5:
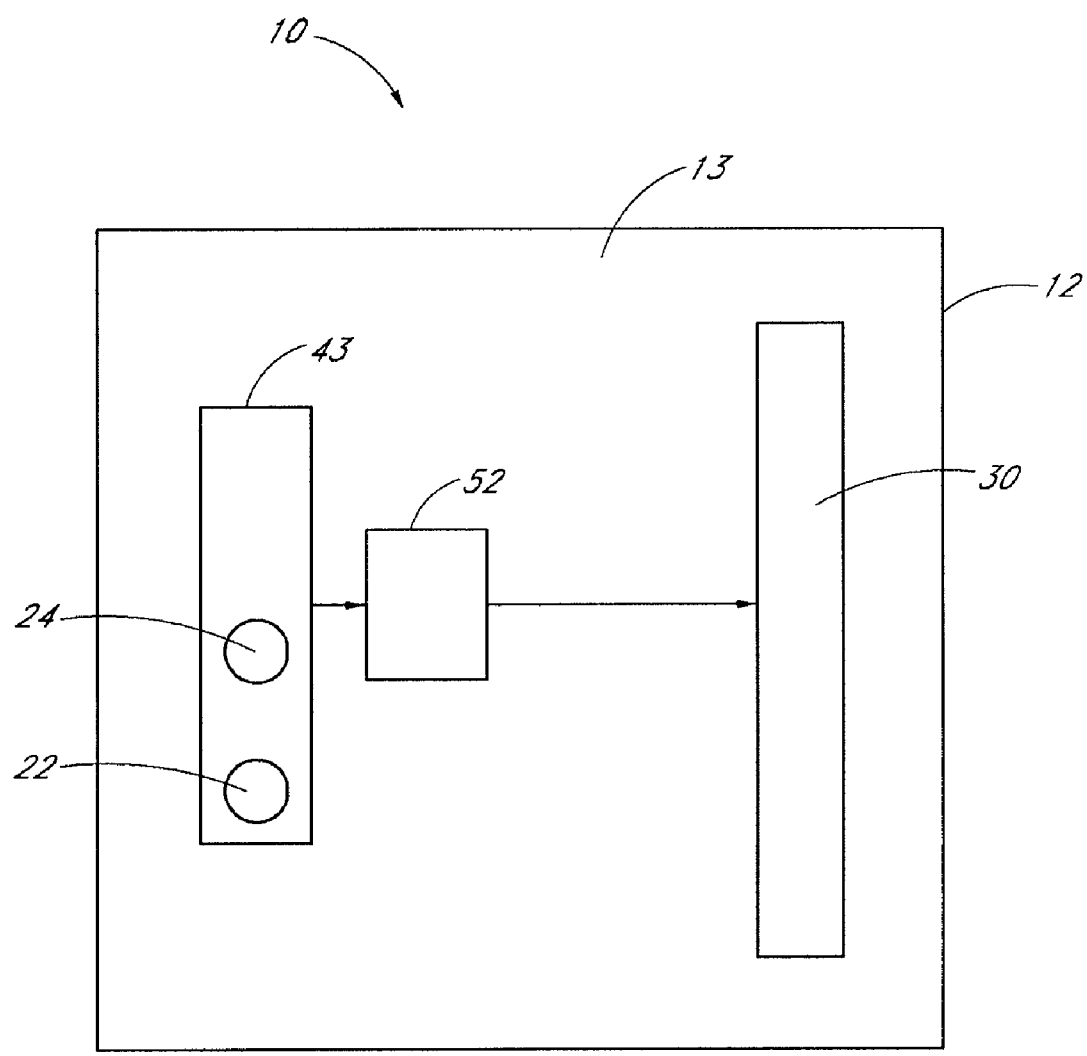
FIG. 5 schematically illustrates a top view of an apparatus including an integrated GPS/AHRS unit in accordance with certain embodiments described herein.

FIG. 5 schematically illustrates a top view of an apparatus 10 including an integrated GPS/AHRS unit 43 in accordance with certain embodiments described herein. Referring again to FIG. 4, the inertial navigation system 42 may comprise a processor and one or more motion sensors (e.g., accelerometers) positioned within the GPS/AHRS unit 43 and may be configured to generally continuously calculate the position, orientation, and/or velocity of the apparatus 10 as it is moved.

As shown in FIG. 4, the second mounting portion 20 of certain embodiments may comprise one or more mounting faces 46 which are described in detail above with respect to FIG. 2.

The apparatus 10 further comprises at least one leveler 48 configured to level the apparatus 10 with respect to the Earth (e.g., to be substantially perpendicular to the direction of gravity). The at least one leveler 48 may comprise a set of one or more adjustable supports, for example. Various adjustment mechanisms are possible. For example, in one embodiment, the leveler 48 comprised a retractable portion (e.g., a threaded rod) which can be used to lengthen or shorten the leveler 48 (e.g., by extending from and retracting into the base portion 12). In another embodiment, the leveler comprises an expandable portion (e.g., a balloon or other finable member) which can be inflated and deflated to adjust the length of the leveler to level the apparatus 10 with respect to the Earth. The apparatus 10 of FIG. 4 comprises three levelers 48 (one of which is not shown) shaped as cylindrical support posts. One leveler 48 is attached to the underside of one corner of the base portion 12, one leveler 48 is attached to the underside of a neighboring corner of the base portion 12, and one leveler 48 (not shown) is attached to the center of a side between two other corners of the base portion 12. In some embodiments, the at least one leveler 48 comprises an elongate leg portion attached to the base portion 12 and a foot portion which contacts the surface beneath the apparatus 100. The foot portion of certain embodiments is generally widened with respect to the leg portion and may be attached to the bottom of the leg portion. In one embodiment, there are four levelers 48, each attached to the underside of one of the four corners of the base portion 12. In another embodiment, the levelers 48 comprise a set of elongate members each attached to and extending laterally from a side of the base portion 12, and extending downwards to make contact with the surface beneath the apparatus 10. In yet other embodiments, the at least one leveler comprises one or more rails extending along the underside of the base portion 12. In other embodiments, there may be one leveler 48, two levelers 48, or more than three levelers 48 and/or the levelers 48 may be shaped or configured differently (e.g., as rectangular posts, blocks, hemispherical protrusions, etc.).

In addition, the apparatus 10 may further comprise at least one level detector 50 configured to generate a signal indicative of the level or tilt of the apparatus 10 with respect to the Earth. In certain such embodiments, the at least one leveler 48 is configured to level the apparatus 10 with respect to the Earth in response to the signal from the at least one level detector 50. For example, the level detector 50 may comprise a bubble-type level detector, or some other type of level detector. In certain embodiments, the apparatus 10 may include one or more supports which are not adjustable. In certain other embodiments (e.g., where the apparatus 100 does not include a leveler 48), the signal from the at least one level detector 50 may be used to adjust computations, such as computations regarding the orientation of the apparatus 10, components thereof (e.g., the directional reference system 16), or the survey tool 30. For example, the signal may be used to compensate for any level differences between the apparatus 10 and the Earth in such computations. In general, the at least one level detector 50, in conjunction with the at least one leveler 48 can be configured to detect tilt of the apparatus 10 and physically level the apparatus 10 in response to such tilt.

In certain embodiments, the apparatus 10 further comprises at least one member (not shown) movably coupled to a portion of the apparatus 10 and configured to allow the apparatus 10 to move along a surface beneath the apparatus 10. The surface may be the Earth's surface, a rig surface, etc. In certain embodiments, the at least one member comprises at least one wheel configured to rotate about at least one axis. In other embodiments, the at least one member may comprise a tread, ski, or other mechanism configured to allow for movement of the apparatus 10 along the surface. For example, in one embodiment the apparatus 10 comprises four with each wheel positioned near a corresponding one of the four corners of the base portion 12. The at least one member may be extendable/retractable such that it can be extended towards the surface (e.g., away from the base portion 12) for use and can be retracted away from the surface (e.g., towards the base portion 12) when the at least one member is not in use. For example, in one embodiment, the at least one member comprises a set of wheels which can be extended from a first position in which the wheels are not in contact with the surface to a second position in which the wheels are in contact with the surface for moving the apparatus 10 along the surface. The wheels can then be raised from the second position back to the first position, such as when the apparatus 10 has reached the desired destination. The raising of the wheels can allow for relatively improved stability of the apparatus 10 on the surface in certain embodiments (e.g., while survey tool is being initialized). In other embodiments, the at least one member is not retractable and is in continuous contact with the surface. In various configurations, generally any number of members (e.g., 1, 2, 3, 4, 5, or more) may be employed.

In certain embodiments, the apparatus 10 further comprises a computing system 52. In certain embodiments, the computer may be in communication with the directional reference system 16 (e.g., as indicated by arrow 47), the inertial navigation system 42 (e.g., as indicated by arrow 45), and/or the survey tool 30 (e.g., as indicated by arrow 49). For example, the computing system 52 may receive data indicative of the orientation of the apparatus 10 with respect to the reference direction 18 from the directional reference system 16. The computing system 52 may also receive information from the inertial navigation system 42, such as information regarding the position, orientation, and/or velocity of the apparatus 10 as it moves along the surface beneath the apparatus 10. The computing system 52 may further be configured to process the information from the directional reference system 16 and/or the inertial navigation system 42 to determine an initial orientation of the survey tool 30. The computing system 52 may further be configured to transmit such information to the survey tool 30 in some embodiments. In other embodiments, the computing system 52 may transmit the data from the directional reference system 16 and/or the inertial navigation 42 directly to the survey tool 30 for at least some of the processing instead of performing the processing of the data itself. In some embodiments, there is no computing system 52, and the survey tool 30 receives the data directly from the directional reference system 16 and the inertial navigation system 42 and processes the data itself.

The apparatus 10 may further comprise a fourth mounting portion 53. The fourth mounting portion 53 comprises an area of the base portion 12 on which the computing system 52 is mounted. In some embodiments, the fourth mounting portion 53 comprises one or more cut-outs or fixtures onto which the computing system 52 may be fitted. In various embodiments, the computing system 52 is releasably secured to the fourth mounting portion 53. For example, the fourth mounting portion 53 may include one or more straps, clamps, snaps, latches, or threads, etc. for mounting the computing system 52. In addition, the computing system 52 may include one or more mating features configured to be coupled to corresponding mating features on the fourth mounting portion 53. In other embodiments, the computing system 52 and the fourth mounting portion 53 may be generally permanently coupled (e.g., welded or glued together). In certain embodiments, the fourth mounting portion 53 comprises or forms a part of a shelf structure which is mounted on or above the base portion 12. For example, in one embodiment, the fourth mounting portion 53 and one or more of the first mounting portion 14, the second mounting portion 20, and the third mounting portion 44 may each comprise separate shelves and form a multi-leveled shelf structure on or over the base portion 12.

The fourth mounting portion 53 may also include one or more ports (e.g., electrical ports) for operatively coupling the computing system 52 to the apparatus 10. For example, the ports may enable electrical communication between the computing system 52 and the apparatus 10 or components thereof.

In certain embodiments, the apparatus 10 further comprises a tool positioning element 56. FIGS. 6A-6C schematically illustrate top, front and right side views, respectively, of an apparatus 10 including a tool positioning element 56. The tool positioning element 56 can be configured to controllably move the wellbore survey tool 30 between a first position relative to the apparatus 10 and a second position relative to the apparatus 10. In certain embodiments, the first position is horizontal with respect to the base portion 12 and the second position is vertical with respect to the base portion 12. In other embodiments, the survey tool 30 may be positioned at an angle relative to the base portion 12 in one or more of the first and second positions. In certain embodiments, the tool positioning element 56 comprises a motorized system such as a motor drive 60. The tool positioning element 56 may be configured to rotate the surface 21 of the second mounting portion 20 to which the survey tool 30 can be coupled and which can be rotated (e.g., using the motorized drive 60 or another motorized system) with respect to the base portion 12 from horizontal to vertical so as to move the survey tool 30 between the first position and the second position. In other embodiments, the tool positioning element 56 comprises a pulley system (e.g., a motorized pulley system) for lifting and lowering the survey tool 30 between the first position and second position, or some other mechanism for moving the survey tool 30.

Figure 6D:
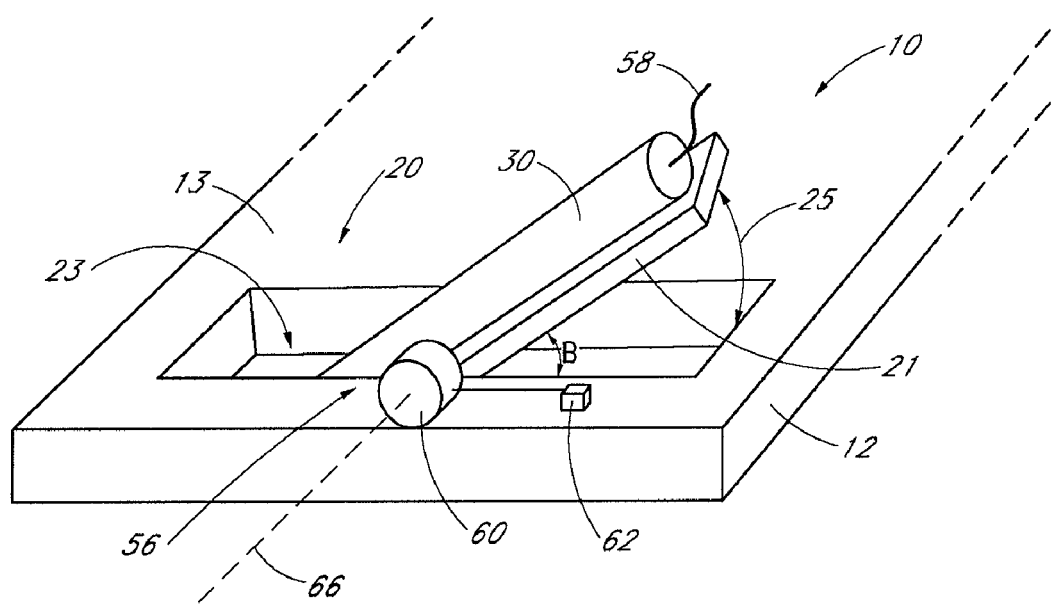
FIG. 6D schematically illustrates a partial perspective view of an apparatus including a tool positioning element during positioning of a survey tool in accordance with certain embodiments described herein.

FIG. 6D schematically illustrates a partial perspective view of an apparatus 10 including a tool positioning element 56 during positioning of a survey tool 30 in accordance with certain embodiments described herein. The drive motor 60 of the apparatus 10 of FIG. 6D is visible through the base portion 12 for the purposes of illustration. As indicated by the directional arrow 25, the tool positioning element 56 is movable between a first (e.g., horizontal) position and a second (e.g., vertical position). The tool positioning element 56 may, in certain embodiments, controllably move or rotate the survey tool 30 in inclination while it is attached or otherwise coupled to the apparatus 10. The survey tool 30 is shown in FIG. 6D during movement of the survey tool 30 by the positioning element 56 between the first and second positions such that the survey tool 30 is currently positioned at an angle β with respect to surface 13 of the apparatus 10. As shown, the drive motor 60 of the positioning element 56 is configured to controllably move the surface 21 to which the survey tool 30 can be generally rigidly attached about the axis 66 between the first and second position.

In one example scenario, the tool positioning element moves the survey tool 30 is mounted to the apparatus 10 in a generally vertical orientation, while the surface 21 is positioned by the tool positioning element 56 in a generally vertical orientation with respect to the surface 13 of the base portion 12. The surface 21 and survey tool 30 mounted thereon are then rotated by the positioning element 56 such that the surface 21 and survey tool 30 are generally horizontal or flush with respect to the surface 13 of the base portion 12. The survey tool 30 may be initialized using the initialization process described herein while in the horizontal position. The survey tool 30 may then be rotated back to the vertical position by the tool positioning element 56 and then disconnected or un-mounted from the apparatus 10 at which point the survey tool 30 may be supported by a wire line 58, for example and lowered into the well bore.

In other embodiments, the survey tool 30 is not rotated to horizontal, but is rotated to some other angle with respect to the apparatus 10 (e.g., 15 degrees, 30 degrees, 45 degrees, 60 degrees, etc.). In addition, the survey tool 30 may not be rotated to a complete vertical position, but to some other angle with respect to the apparatus 10. In other embodiments, the apparatus 10 does not include a positioning element 56. In such embodiments, the survey tool 30 may be mounted generally in the orientation (e.g., vertical with respect to the surface 13 of the apparatus 10) in which the apparatus 10 will be deployed to the well bore. In addition, the positioning element 56 may be positioned or mounted differently on the apparatus 10. For example, the motor drive 60 and corresponding axis 66 are shown positioned generally in the middle cut-out portion 23 in FIG. 6D. As such, when the survey tool 30 is positioned in the vertical position, half of the survey tool 30 is positioned substantially above the base portion 12 and the other half of the survey tool 30 is positioned above the base portion 12. In other embodiments, the corresponding motor drive 60 axis 66 may be positioned differently, such as generally at one end of the cut-out portion 23. In some such cases, the positioning element 56 may rotate the survey tool 30 generally from a horizontal position to a vertical position in which a survey tool 30 or a substantial portion thereof is rotated under the base portion 12. In other such cases, the positioning element may rotate the survey tool 30 generally from a horizontal position to a vertical position in which a survey tool 30 or a substantial portion thereof is rotated above the base portion 12.

It is desirable to move (e.g., rotate) the tool at a relatively low rate (e.g., within the rate limits of the gyroscopes on the survey tool 30). Certain embodiments advantageously avoid turning of the survey tool 30 undesirably high turn rates which exceed the maximum rates which can be measured by one or more rotation sensors (e.g., gyroscopes) of the survey tool 30. Under such undesirable conditions, the orientation data (e.g., directional reference data) stored in the survey tool 30 can be lost and subsequent orientation (e.g., attitude and/or azimuth) processing will be in error. By controllably moving the survey tool 30 (e.g., using the drive motor 60 about the axis 66), the tool positioning element 56 may, in certain embodiments, avoid saturation of sensors of the survey tool 30 and thereby allow the survey tool 30 to continue to keep track of its rotation as it is moved.

In an example use scenario, the apparatus 10 can be location at a position at which the directional reference system 16 is operational and the reference direction 18 may be determined using the directional reference system 16 (e.g., a GPS signal receiver). The apparatus 10 may then be moved physically to the well head of the wellbore (e.g., using the at least one member movably coupled to a portion of the apparatus 10) with the orientation or directional reference being maintained, monitored, or detected by the inertial navigation system 42 (e.g., an AHRS unit) while the apparatus 10 is moved. In certain embodiments, this movement occurs over a relatively short period of time (e.g., on the order of several minutes). Once positioned at the well head, the survey tool 30 may be placed into a designated position (e.g., to the second mounting portion 20) and clamped to the apparatus 10. The orientation data (e.g., attitude, azimuth and/or heading data) may then be transmitted from the inertial navigation system 42 (e.g., an AHRS) to the wellbore survey tool 30 to initialize the survey tool 30. For example, the orientation data may be transmitted to an inertial system within the survey tool 30 via the computing system 52 or, alternatively, directly to the wellbore survey tool 30. In certain other embodiments, the survey tool 30 is mounted on to the apparatus 10 while the apparatus 10 is moved from the first position to the second position.

Figure 7:
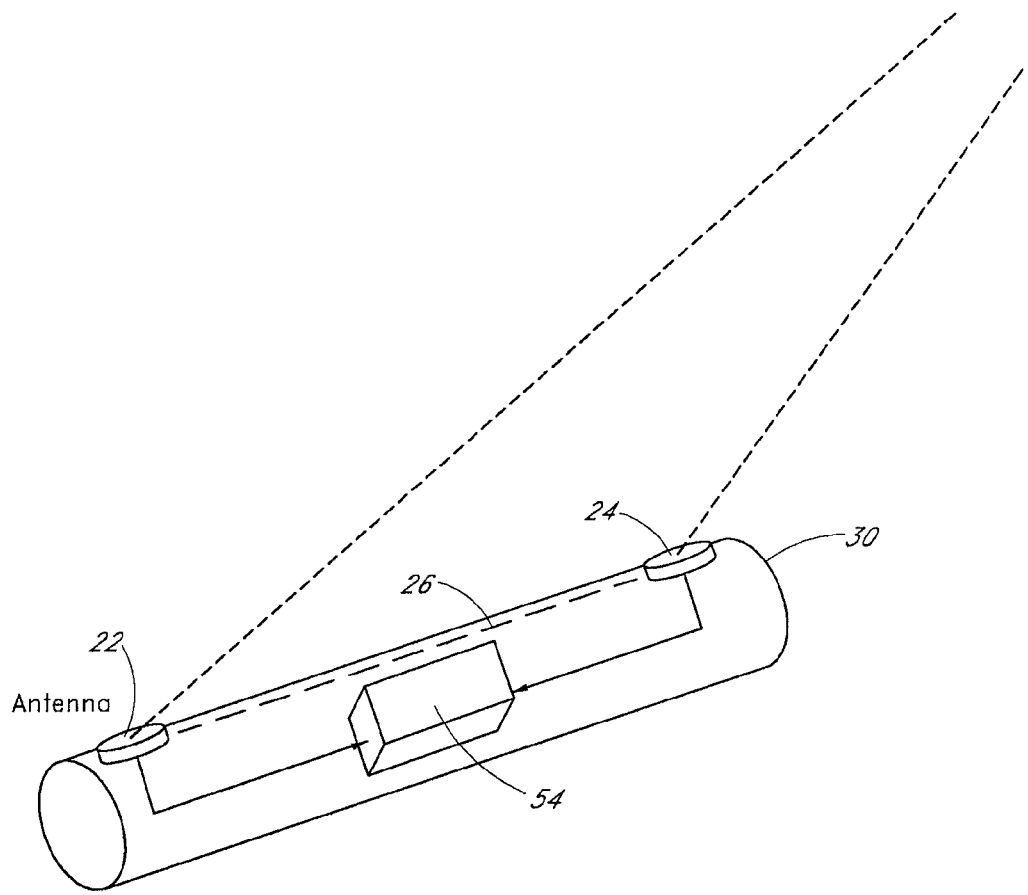
FIG. 7 schematically illustrates an example wellbore survey tool on which a directional reference system is directly mounted in accordance with certain embodiments described herein.

FIG. 7 schematically illustrates an embodiment in which the directional reference system 16 is mounted directly on the wellbore survey tool 30 in accordance with certain embodiments described herein. The directional reference system 16 comprises at least one signal receiver of a global positioning system (GPS) which can include a first antenna 22 and a second antenna 24 spaced apart and defining a line 26 from the first antenna 22 to the second antenna 24. In certain embodiments, the survey tool 30 comprises a processor 54 configured to receive signals from the first and second antennae 22, 24 and to determine an orientation of the line 26 with respect to the reference direction in response to the signals. Because a processor 54 of the survey tool 30 may be used instead of a dedicated processor of the directional reference system 16, hardware costs may thereby be reduced. In addition, because the directional reference system 16 may be directly mounted on the survey tool 30, there may be less calibration inaccuracy due to possible misalignments in the orientation of the directional reference system 16 with respect to the survey tool 30. In other embodiments, the directional reference system 16 comprises a processor which is used to determine the orientation and a processor of the survey tool 30 is not used. For example, the processor 53 may be configured to determine an orientation (e.g., attitude and/or azimuth) of the directional reference system with respect to the reference direction.

Where the directional reference system 16 (e.g., a GPS signal receiver comprising the two or more antennae 22, 24) is mounted on or within the survey tool 30 itself, as illustrated in FIG. 7, the survey tool 30 itself can be mounted relatively rigidly on the drilling rig (e.g., in a horizontal or other non-vertical orientation) to conduct the initialization process (e.g., initial attitude and heading determination). For example, the orientation (e.g., attitude) determination may be made using measurements of the phase difference in the satellite carrier signals (e.g., between the antennae 22, 24). Such a determination may be made by computation by the processor 54 within the survey tool 30, for example. This information may again be used to define the initial attitude of the survey tool 30 prior to engaging or initializing a continuous survey mode. The attitude data (e.g., data derived from GPS data from the directional reference system 16) can form the initial conditions for the gyro measurement integration process, which allows for tracking of the attitude of the survey tool 30 after the initialization.

In certain embodiments, the apparatus 10 further comprises at least one of the at least one directional reference system 16 and the at least one inertial navigation system 42. In certain embodiments in which the apparatus comprises the at least one directional reference system 16, the apparatus 10 further comprises a mounting portion (e.g., one or more portions of the base portion 12, the first mounting portion 14, the second mounting portion 20, the third mounting portion 44, and the fourth mounting portion 53) mechanically coupled to the at least one directional reference system 16 and configured to be mechanically coupled to the wellbore survey tool 30 while the wellbore survey tool 30 is outside a wellbore such that the wellbore survey tool 30 has a predetermined orientation with respect to the at least one directional reference system 16 while the wellbore survey tool 30 is outside the wellbore. The mounting portion may be further configured to be mechanically decoupled from the wellbore survey tool 30 while the wellbore survey tool 30 is within the wellbore. The apparatus 10 may further comprise a support structure configured to allow the apparatus to move along a surface beneath the apparatus while the wellbore survey tool 30 is transported outside the wellbore. For example, in certain embodiments, the support structure may comprise one or more of the base portion 12, the at least one member movably coupled to a portion of the apparatus 10, the at least one leveler 48, or portions thereof, as described herein.

Embodiments described herein may further be used to provide a relatively long term attitude reference on the drilling rig. As discussed, after initialization of the survey tool 30 according to embodiments described herein, the survey tool 30 may be deployed into the wellbore and used to conduct a survey (e.g., in continuous survey mode). In certain cases, the survey tool 30 may have been initialized accurately according to embodiments described herein prior to deployment, but calibration errors may accumulate during operation, thereby causing "drift." Such calibration errors may be acceptable under certain circumstances (e.g., where the drift of less than about 10%). However, relatively large calibration errors can be problematic and it can be desirable to measure such errors. In certain embodiments, after withdrawal of the survey tool 30 from the wellbore, the survey tool 30 orientation (e.g., attitude) determined by the survey tool 30 can be compared to a reference orientation (e.g., attitude) determined by the apparatus 10 to can provide a post-survey check on the calibration or amount of drift of the survey tool 30. For example, the survey tool 30 may be mounted to the apparatus 10 following its withdrawal from the wellbore and readings of the orientation (e.g., attitude) of the survey tool 30 from the survey tool 30 may be compared to readings of the orientation (e.g., attitude) from the directional reference system 16. In certain other embodiments, the orientation readings from the survey tool 30 may be compared to readings from the orientation of the inertial navigation system 42, or from an integrated device such as the GPS/AHRS 43 of FIG. 5. Differences in orientation determined from such a comparison may correspond to calibration errors or "drift." This general process may be described as a quality control (QC) check on the 'health' of the survey tool 30, for example.

Figure 8:
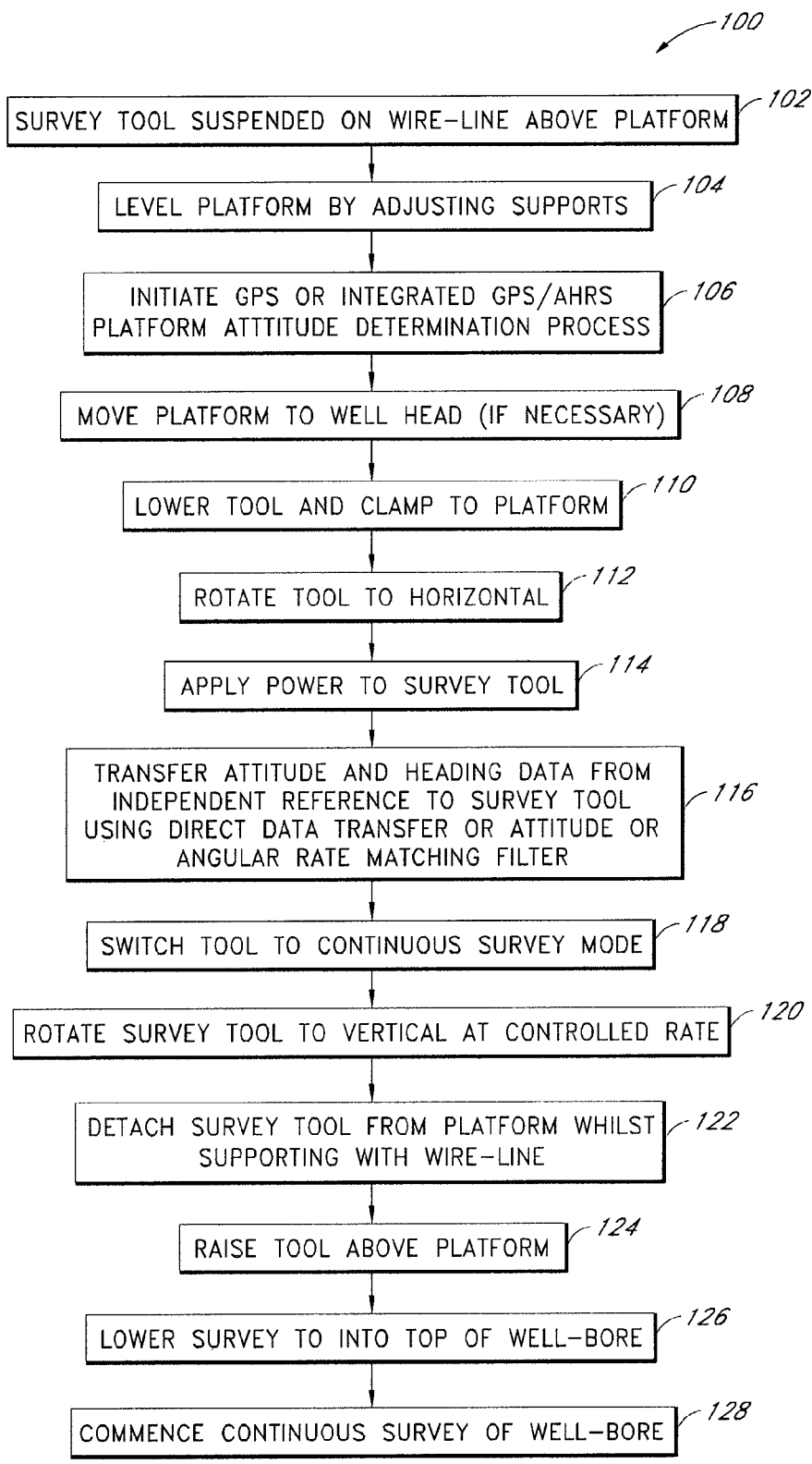
FIG. 8 is a flow diagram illustrating an example wellbore survey tool initialization process in accordance with certain embodiments described herein.

FIG. 8 is a flow diagram illustrating an example wellbore survey tool 30 initialization process 100 in accordance with certain embodiments described herein. While the flow diagram 100 is described herein by reference to the apparatus 10 schematically illustrated by FIGS. 2-6, other apparatus described herein may also be used (e.g., the apparatus 400 of FIG. 11). At operational block 102, the survey tool 30 can be suspended above the base portion of the apparatus 10, such as by a wire-line, for example. The apparatus 10 may then be leveled at operational block 104 by adjusting one or more of the at least one levelers 48 (e.g., an adjustable support), for example.

At operational block 106, the directional reference system 16 (e.g., GPS receiver, integrated GPS/AHRS) and/or inertial navigation system 42 may be initiated and may generate one or more signals indicative of the orientation (e.g., the attitude, azimuth, and/or heading) of the apparatus 10. At operational block 108, the apparatus 10 may be moved to the well head of the wellbore. This movement of the apparatus 10 may be performed in situations where the apparatus 10 has initially been positioned away from the wellbore, to avoid interference from a derrick, for example. The survey tool 30 may be lowered and attached to the apparatus 10 (e.g., clamped to the second mounting portion 20) at operational block 110. The survey tool 30 may be rotated to the horizontal (e.g., with respect to the base portion 12 of the apparatus 10) at operational block 112 and power may be supplied to the survey tool 30 at operational block 114.

At operational block 116, the orientation (e.g., attitude, azimuth, and/or heading) data from the directional reference system 16, inertial navigation system 42, or both, may be transferred to the survey tool 30. In some embodiments, an angular rate matching process (e.g., using an angular rate matching filter) as described below is employed. The tool may be switched to continuous survey mode at operational block 118, and moved (e.g., rotated using the tool positioning element 56) to vertical (e.g., with respect to the apparatus 10) at a controlled rate at operational block 120. The survey tool 30 can be detached from the apparatus 10 while still being supported (e.g., by a wire-line) at operational block 122 and raised above the apparatus 10 at operational block 124. The survey tool 30 may be lowered into the top of the wellbore at operational block 126 and continuous surveying may be enabled at operational block 128.

Figure 9:
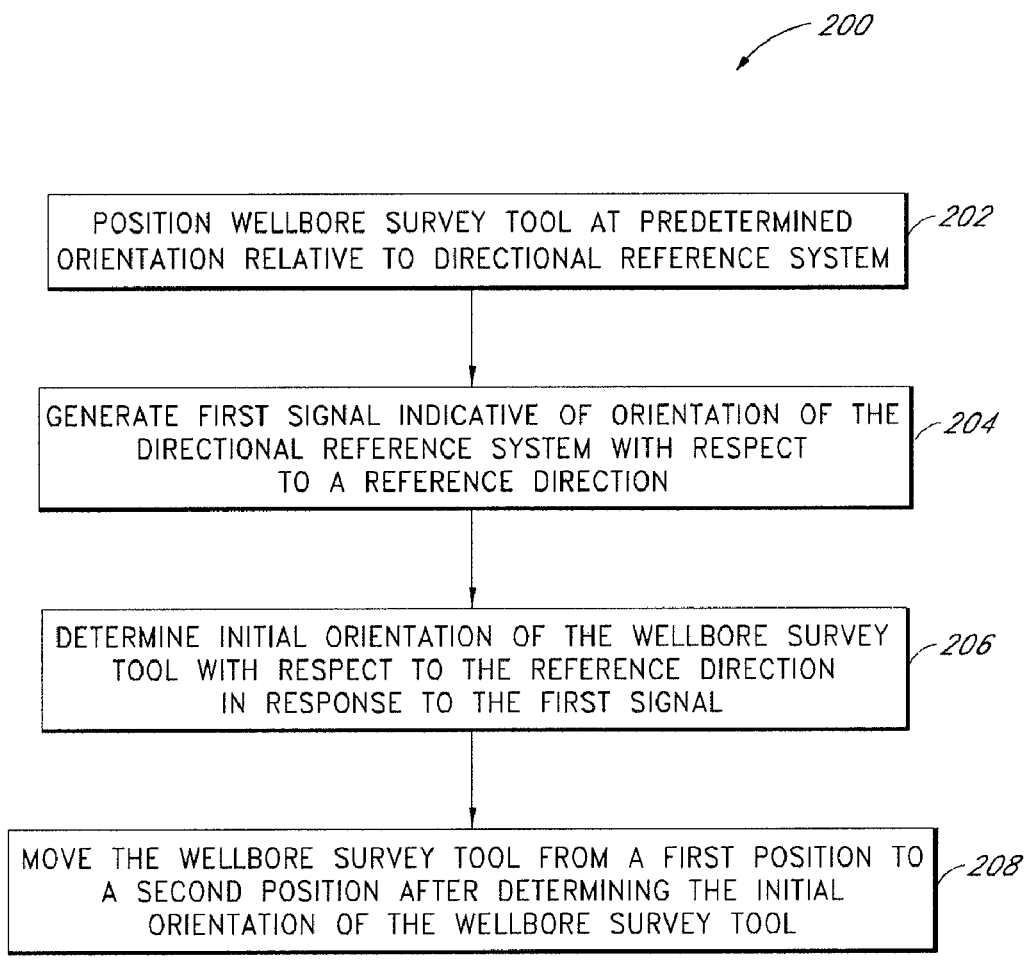
FIG. 9 is a flowchart of an example method of initializing a wellbore survey tool in accordance with certain embodiments described herein.

FIG. 9 is a flowchart of an example method 200 of initializing a wellbore survey tool 30 in accordance with certain embodiments described herein. At operational block 202, the method 200 includes positioning a wellbore survey tool 30 at a predetermined orientation relative to a directional reference system 16. For example, the wellbore survey tool 30 may be positioned substantially parallel to the directional reference system 16 in certain embodiments. While the method 200 is described herein by reference to the apparatus 10 described with respect to FIGS. 2-7, other apparatus described herein may be used (e.g., the apparatus 400 of FIG. 11).

At operational block 204, the method 200 of certain embodiments further comprises generating a first signal indicative of an orientation of the directional reference system 16 with respect to a reference direction 18. For example, the first signal may be generated by the directional reference system 16, and the reference direction may be north. The method 200 may further comprise determining an initial orientation of the wellbore survey tool 30 with respect to the reference direction 18 in response to the first signal at operational block 206. For example, a computing system 52 of the apparatus 10 may receive the first signal from the directional reference system 16 and determine the orientation of the directional reference system 16 with respect to the reference direction 18 in response to the first signal. In certain embodiments, because the wellbore survey tool 30 is positioned at a predetermined orientation (e.g., parallel) relative to the directional reference system 16, the computing system 52 can also determine the initial orientation of the survey tool 30 with respect to the reference direction 18.

At operational block 208, the method 200 further comprises moving the wellbore survey tool 30 from a first position to a second position after determining the initial orientation of the wellbore survey tool 30. For example, the wellbore survey tool 30 may be substantially horizontal with respect to the Earth when in the first position and the wellbore survey tool 30 may be substantially vertical with respect to the Earth when in the second position. The tool positioning element 56, (e.g., a motorized system) can be used to controllably move the survey tool from the first position to the second position, as described herein.

In some embodiments, the method 200 may further comprise moving the wellbore survey tool 30 from a first location 32 to a second location 34 (FIG. 3) after generating the first signal. The first location 32 may be farther from the wellbore than the second location 34. As described herein, the directional reference system 16 may be able to accurately determine the orientation of the directional reference system 16 with respect to the reference direction 18 at the first location 32. For example, the directional reference system 16 may comprise a signal receiver of a satellite navigation system which can communicate with satellites of the satellite navigation system free from shielding or other interference from the derrick 31 at the first location 32, but not at the second location 34. The wellbore survey tool 30 may have a first orientation with respect to the reference direction 18 when at the first location 32 and a second orientation with respect to the reference direction 18 when at the second location 34. For example, the orientation of the apparatus 10, and thus of the directional reference system 16 and the survey tool 30 coupled to the apparatus 10, may change in angle with respect to the reference direction 18 as the apparatus 10 moves from the first location 32 to the second location 34.

The method 200 may further comprise generating a second signal indicative of a change in orientation between the first orientation and the second orientation. For example, the computing system 52 may receive the second signal from the inertial navigation system 42. In certain embodiments, the determining the initial orientation in the operational block 206 comprises determining the initial orientation of the wellbore survey tool 30 with respect to the reference direction 18 in response to the first signal and in response to the second signal. For example, the computing system 52 may determine the first orientation of the directional reference system 16 and thus the survey tool 30 at the first location in response to the first signal. The computing system 52 may then determine the change in orientation of the survey tool between the first orientation and the second orientation in response to the second signal. The computing system 52 may further process the first and second signals (e.g., add the change in orientation to the initial orientation) to determine the initial orientation of the survey tool 30 at the second location.

C. Example Attitude Computation in the Survey Tool

In certain circumstances, the initial orientation data (e.g., reference attitude data determined in accordance with embodiments described herein) form the initial conditions for the gyro measurement integration process which can keep track of survey tool 30 attitude while a continuous survey mode of operation is maintained. During continuous periods of operation (e.g., during continuous survey mode), the survey tool 30 may keep track of attitude (tool face, inclination and azimuth) using the integrated outputs of the gyroscopes. Tracking of the attitude may involve solving the following equations to provide estimates of tool-face ($\alpha$), inclination (I) and azimuth (A) angles:

$$\alpha = \alpha_0 + \int \dot{\alpha} dt; \qquad (Eq.\ 2)$$

$$I = I_0 + \int \dot{I} dt;\ \text{and} \qquad (Eq.\ 3)$$

$$A = A_0 + \int \dot{A} dt, \qquad (Eq.\ 4)$$

where $\alpha_0$, $I_0$ and $A_0$ are the initial values of tool face, inclination and azimuth, and $\dot{\alpha}$, $\dot{I}$, and $\dot{A}$ are the estimated rates of change of $\alpha$, I and A which may be expressed as function of the gyro measurements (denoted $G_x$, $G_y$ and $G_z$) as follows:

$$\dot{\alpha} = G_z + (G_x \sin\alpha + G_y \cos\alpha)\cot I - \frac{\Omega_H \cos A}{\sin I}; \qquad (Eq.\ 5)$$

$$\dot{I} = -G_x \cos\alpha + G_y \sin\alpha + \Omega_H \sin A;\ \text{and} \qquad (Eq.\ 6)$$

$$\dot{A} = -\frac{(G_x \sin\alpha + G_y \cos\alpha)}{\sin I} + \Omega_H \cos A \cot I - \Omega_v. \qquad (Eq.\ 7)$$

where $\Omega_H$ and $\Omega_v$ represent the horizontal and vertical components of Earth's rate. The initial value of the azimuth angle can be derived directly from the GPS attitude estimation process. An initial value of inclination may also be derived using the GPS measurements, or using survey tool 30 accelerometer measurements ($A_x$, $A_y$, and $A_z$) and the following equation:

$$I_0 = \arctan\left[\frac{\sqrt{A_x^2 + A_y^2}}{A_z}\right]. \qquad (Eq.\ 8)$$

The initial value of inclination may also be determined using a combination of both satellite and accelerometer estimates. Tool-face angle is initialized using accelerometer measurements as follows:

$$\alpha_0 = \arctan\left[\frac{-A_x}{-A_y}\right].$$

D. Example Alternative Method of Computing Attitude

In accordance with certain embodiments described herein, the use of direction cosines allows the tool orientation to be tracked generally at any attitude, such as when the tool is at or near vertical as occurs during tool pick-up and initial descent in the wellbore. This allows the methods of keeping track of tool-face angle and azimuth discussed in the previous section, which may be relatively imprecise, to be avoided. The use of the quaternion attitude representation can provide an alternative in this situation.

The attitude of an alignment structure (e.g., the directional reference system 16) on the apparatus 10, such as on a platform (P) of the apparatus 10 with respect to the local geographic reference frame (R) (e.g., the reference direction 18), which may be determined from the GPS measurements, may be expressed in term of the direction cosine matrix $C_P^R$. The reference frame R can be generally defined by the directions of true north and the local vertical. In certain other configurations, other Earth fixed reference frames may be used. The platform (P) may comprise or form a part of the base portion 12, for example. Given knowledge of the mounting orientation of the survey tool (T) 30 with respect to the alignment structure (e.g., the directional reference system 16), which may also be expressed as a direction cosine matrix, $C_T^P$, the attitude of the survey tool 30 with respect to the geographic reference frame (R) is given by the product of these matrices, as follows:

$$C_T^R = C_P^R \cdot C_T^P \qquad \text{(Eq. 9)}$$

After switching to continuous survey mode, the survey tool 30 can keep track of tool attitude as it traverses the wellbore by solving the equation below. Expressing $C = C_T^R$ and the initial value derived from the GPS measurements as $C_o$, $$C = C_o + \int \dot{C} \, dt, \qquad \text{(Eq. 10)}$$

where $$\dot{C} = C \cdot [\omega X] \qquad \text{(Eq. 11)}$$

$$\omega = \begin{bmatrix} G_x \\ G_y \\ G_z \end{bmatrix} - C^T \cdot \begin{bmatrix} \Omega_H \\ 0 \\ \Omega_V \end{bmatrix} \qquad \text{(Eq. 12)}$$

Attitude information expressed in terms of tool-face, inclination and azimuth may be computed, from the elements of the direction cosine matrix:

$$C = \begin{bmatrix} c_{11} & c_{12} & c_{13} \\ c_{21} & c_{22} & c_{23} \\ c_{31} & c_{32} & c_{33} \end{bmatrix},$$

which may also be expressed as function of these angles as follows:

$$C = \begin{bmatrix} \cos A \cos I \sin \alpha + \sin A \cos \alpha & \cos A \cos I \cos \alpha - \sin A \sin \alpha & \cos A \sin I \\ \sin \alpha \cos I \sin \alpha - \cos A \cos \alpha & \sin A \cos I \cos \alpha + \cos A \sin \alpha & \sin A \sin I \\ -\sin I \sin \alpha & -\sin I \cos \alpha & \cos I \end{bmatrix} \qquad \text{(Eq. 13)}$$

In certain embodiments, the tool-face, inclination and azimuth angles may be extracted using the following equations:

$$\alpha = \arctan\left[\frac{-c_{31}}{-c_{32}}\right]; \qquad \text{(Eq. 14)}$$

$$I = \arctan\left[\frac{\sqrt{c_{31}^2 + c_{32}^2}}{c_{33}}\right]; \text{ and} \qquad \text{(Eq. 15)}$$

$$A = \arctan\left[\frac{c_{23}}{c_{13}}\right]. \qquad \text{(Eq. 16)}$$

For example, using the above equation for inclination for the situation where inclination approaches 90°, $c_{33}$ approaches zero and I may become indeterminate. In this case, inclination may be expressed as follows:

$$I = \arccos[c_{33}]. \qquad \text{(Eq. 17)}$$

For the situation where I passes through zero, the equations in $\alpha$ and A generally become indeterminate because both the numerator and the denominator approach zero substantially simultaneously. Under such conditions, alternative solutions for $\alpha$ and A can be based upon other elements of the direction cosine matrix. For example, $\alpha$ and A can be determined as follows:

$$c_{11} + c_{22} = \sin(\alpha + A) \cdot (\cos I + 1); \qquad \text{(Eq. 18)}$$

$$c_{21} - c_{12} = \cos(\alpha + A) \cdot (\cos I + 1), \qquad \text{(Eq. 19)}$$

and the following expression for the sum of azimuth and tool face may be written:

$$\alpha + A = \arctan\left[\frac{c_{11} + c_{22}}{c_{21} - c_{12}}\right]. \qquad \text{(Eq. 20)}$$

This quantity corresponds to the so-called gyro tool-face angle that is currently computed while the tool is at or near vertical.

Separate solutions for $\alpha$ and A may not be obtained when I=0 because both generally become measures of angle about parallel axes (about the vertical), i.e. a degree of rotational freedom is lost. Either $\alpha$ or A may be selected arbitrarily to satisfy some other condition while the unspecified angle is chosen to satisfy the above equation. To avoid 'jumps' in the values of $\alpha$ or A between successive calculations when I is in the region of zero, one approach would be to 'freeze' one angle, $\alpha$ for instance, at its current value and to calculate A in accordance with the above equation. At the next iteration, A would be frozen and $\alpha$ determined. The process of updating $\alpha$ or A alone at successive iterations could generally continue until I is no longer close to zero.

E. Example Attitude Matching Filter for the Transfer of Orientation Data (e.g., Attitude and Heading Reference Data) to the Survey Tool In certain embodiments, orientation (e.g., attitude) data extracted from satellite navigation techniques (e.g., using the directional reference system 16) can be combined with inertial system data (e.g., from the inertial navigation system 42).

For example, a least-squares or Kalman filtering process can be used determine a relatively accurate estimate (e.g., a best estimate) of survey tool 30 orientation (e.g., attitude) prior to engaging/initializing the continuous survey mode. Data which may be determined while the survey tool 30 is at the surface includes:

(1) satellite based estimates of azimuth and inclination (e.g., using the directional reference system 16);

(2) estimates of inclination and high-side tool-face angle of the survey tool 30 using accelerometers of the survey tool 30;

(3) estimates of azimuth, inclination and tool-face angle of the survey tool 30 using sensors gyroscopes of the survey tool 30;

An example filtering process is provided herein. Embodiments described herein include a Kalman filter formulation that may be used to initialize the continuous survey process while the survey tool 30 is at the surface. In certain embodiments, it may be assumed that the survey tool 30 provides measurement of acceleration along, and turn rate about, the three principal axes of the tool, denoted x, y and z. While continuous estimates of survey tool 30 orientation can be derived from the gyro measurements by a process of integration, it may further be assumed that the accelerometer measurements can provide a separate and independent estimate of survey tool orientation with respect to the local vertical. Further, a satellite attitude determination process (e.g., using the directional reference system 16) provides estimates of survey tool 30 azimuth during this period. Gyro, accelerometer and GPS based attitude estimates can be combined using a Kalman filter as described below. In addition to providing initial estimates of tool orientation (e.g., attitude), the filtering process may also be used to form estimates of any residual gyro biases and mass unbalance.

System Equations

During periods where the survey tool 30 is in continuous mode, the tool keeps track of attitude (e.g., tool face, inclination and azimuth) using the integrated outputs of the gyroscopes. This may be achieved by solving the following equations to provide estimates of tool face ($\alpha$), inclination (I) and azimuth (A) angles directly. For example, these values may be expressed as follows:

$$\alpha = \alpha_0 + \int \dot{\alpha} dt; \quad (eq.\ 21)$$

$$I = I_0 + \int \dot{I} dt; \text{ and} \quad (eq.\ 22)$$

$$A = A_0 + \int \dot{A} dt, \quad (eq.\ 23)$$

where $\alpha_0$, $I_0$ and $A_0$ are the initial values of tool face, inclination and azimuth (e.g., approximate values derived based on a relatively coarse gyro-compassing procedure available at high latitude, or in the presence of platform rotational motion), and $$\dot{\alpha} = G_z + (G_x \sin\alpha + G_y \cos\alpha)\cot I - \frac{\Omega_H \cos A}{\sin I}; \quad (eq.\ 24)$$

$$\dot{I} = -G_x \cos\alpha + G_y \sin\alpha + \Omega_H \sin A; \text{ and} \quad (eq.\ 25)$$

$$\dot{A} = -\frac{(G_x \sin\alpha + G_y \cos\alpha)}{\sin I} + \Omega_H \cos A \cot I - \Omega_v, \quad (eq.\ 26)$$

where $G_x$, $G_y$ and $G_z$ are measurements of angular rate about the x, y and z axes of the survey tool.

System Error Equations

System error equations may be expressed as follows:

$$\Delta\dot{\alpha} = (G_x \cos\alpha - G_y \sin\alpha)\cot I \cdot \Delta\alpha - \quad (eq.\ 27)$$
$$\frac{(G_x \sin\alpha + G_y \cos\alpha)}{\sin^2 I} \cdot \Delta I + \frac{\Omega_H \cos A \cot I}{\sin I}\Delta I +$$
$$\frac{\Omega_H \sin A}{\sin I}\Delta A + \sin\alpha \cot I \cdot \Delta G_x + \cos\alpha \cot I \cdot \Delta G_y + \Delta G_z;$$

$$\Delta\dot{I} = (G_x \sin\alpha + G_y \cos\alpha)\cdot\Delta\alpha + \Omega_H \cos A \cdot \Delta A; \text{ and}$$

$$-\cos\alpha \cdot \Delta G_x + \sin\alpha \cdot \Delta G_y \quad (eq.\ 28)$$

$$\Delta\dot{A} = -\frac{(G_x \cos\alpha - G_y \sin\alpha)}{\sin I} \cdot \Delta\alpha + \quad (eq.\ 29)$$
$$\frac{(G_x \sin\alpha + G_y \cos\alpha)\cot I}{\sin I} \cdot \Delta I - \frac{\Omega_H \cos A}{\sin^2 I} \cdot \Delta I -$$
$$\Omega_H \sin A \cot I \cdot \Delta A - \frac{\sin\alpha}{\sin I} \cdot \Delta G_x - \frac{\cos A}{\sin I} \cdot \Delta G_y;$$

The system error equations may further be expressed in matrix form as:

$$\dot{x} = F \cdot x + G \cdot w, \quad (eq.\ 30)$$

where $$x = [\Delta\alpha \Delta I \Delta A \Delta G_x \Delta G_y \Delta G_z]^T \quad (eq.\ 31)$$

and represents the system error states, w is a 3 element vector representing the gyro measurement noise, G is the system noise matrix and the error matrix F can be given by:

$$F = \begin{bmatrix} (G_x\cos\alpha - G_y\sin\alpha)\cot I & \begin{array}{c}-(G_x\sin\alpha + G_y\cos\alpha) + \\ \frac{\Omega_H \cos A \cos I}{\sin^2 I}\end{array} & \frac{\Omega_H \sin A}{\sin I} & \sin\alpha\cot I & \cos\alpha\cot I & 1 \\ (G_x\sin\alpha + G_y\cos\alpha) & 0 & \Omega_H \cos A & -\cos\alpha & \sin\alpha & 0 \\ -\frac{(G_x\cos\alpha - G_y\sin\alpha)}{\sin I} & \begin{array}{c}(G_x\sin\alpha + G_y\cos\alpha)\cos I - \\ \frac{\Omega_H \cos A}{\sin^2 I}\end{array} & -\Omega_H \sin A \cot I & -\frac{\sin\alpha}{\sin I} & -\frac{\cos\alpha}{\sin I} & 0 \\ 0 & 0 & 0 & 0 & 0 & 0 \\ 0 & 0 & 0 & 0 & 0 & 0 \\ 0 & 0 & 0 & 0 & 0 & 0 \end{bmatrix} \quad (eq.\ 32)$$

Filter Measurement Equations

Three accelerometers in the survey system (e.g., the survey tool 30) can provide independent measurement of tool face and inclination angles, as shown by the following equations:

$$\tilde{\alpha} = \arctan\left(\frac{A_x}{A_y}\right); \text{ and} \quad \text{(eq. 33)}$$

$$\tilde{I} = \arctan\left(\frac{\sqrt{A_x^2 + A_y^2}}{A_z}\right), \quad \text{(eq. 34)}$$

and it can be assumed for the purposes of this example filter formulation that an estimate of survey tool 30 azimuth (Ã) is provided by the satellite attitude determination process (e.g., using the directional reference system 16).

The differences between the two estimates of tool-face, inclination and azimuth can form the measurement difference inputs (z) to a Kalman filter, as follows:

$$z = \begin{bmatrix} \tilde{\alpha} - \alpha \\ \tilde{I} - I \\ \tilde{A} - A \end{bmatrix}. \quad \text{(eq. 35)}$$

The measurement differences (z) may also be expressed in terms of the error states (x) as follows:

$$z = H \cdot x + I \cdot v, \quad \text{(eq. 36)}$$

$$\text{where } H = \begin{bmatrix} 1 & 0 & 0 & 0 & 0 & 0 \\ 0 & 1 & 0 & 0 & 0 & 0 \\ 0 & 0 & 1 & 0 & 0 & 0 \end{bmatrix}, \quad \text{(eq. 37)}$$

v may be a 3 element vector that represents the accelerometer measurement and GPS azimuth measurement noise, and I is a measurement noise matrix.

Kalman Filter Equations

Discrete System and Measurement Equations

While the system may be described mathematically in the continuous differential equation form given above, the measurements are in practice provided at discrete intervals of time. To address with this, and to provide a computationally efficient filtering algorithm, the continuous equations can be expressed in the form of difference equations as shown below:

$$x_{k+1} = \Phi_k \cdot x_k + \Delta_k \cdot w_k; \quad \text{(eq. 38)}$$

where $$\Phi_k = \exp[F \cdot (t_{k+1} - t_k)], \quad \text{(eq. 39)}$$

with measurements expressed as:

$$z_{k+1} = H_{k+1} x_{k+1} v_{k+1}, \quad \text{(eq. 40)}$$

and where
  $x_k$ = error state at time $t_k$,
  $w_k$ = system noise at time $t_k$,
  $\Phi_k$ = state transition matrix from time $t_k$ to time $t_{k+1}$,
  $\Delta_k$ = system noise matrix at time $t_k$,
  $z_{k+1}$ = measurement difference at time $t_{k+1}$,
  $v_{k+1}$ = measurement noise at time $t_{k+1}$, and
  $H_{k+1}$ = measurement matrix calculated at time $t_{k+1}$.

The noise can be zero mean, but now discrete, and can be characterized by the covariance matrices $Q_k$ and $R_k$ respectively.

Prediction Step

A relatively accurate estimate (e.g., a best estimate) of the error state at time $t_k$ is denoted below by $x_{k/k}$. Since the system noise $w_k$ of certain embodiments has zero mean, the best prediction of the state at time $t_{k+1}$ can be expressed as:

$$x_{k+1/k} = \Phi_k \cdot x_{k/k}, \quad \text{(eq. 41)}$$

while the expected value of the covariance at time $t_{k+1}$ predicted at time $t_k$, can be given by:

$$P_{k+1/k} = \Phi_k \cdot P_{k/k} \cdot \Phi_k^T + \Delta_k \cdot Q_k \cdot \Delta_k^T. \quad \text{(eq. 42)}$$

Measurement Update

The arrival of a new set of measurements $z_{k+1}$ at time $t_{k+1}$ can be used to update the prediction to generate a relatively accurate estimate (e.g., a best estimate) of the state at this time. For example, a relatively accurate (e.g., best) estimate of the state at time $t_{k+1}$ can be expressed as:

$$x_{k+1/k+1} = x_{k+1/k} - K_{k+1}[H_{k+1} x_{k+1/k} - z_{k+1}], \quad \text{(eq. 43)}$$

and its covariance by:

$$P_{k+1/k+1} = P_{k+1/k} - K_{k+1} H_{k+1} P_{k+1/k}, \quad \text{(eq. 44)}$$

where the Kalman gain matrix can be given by:

$$K_{k+1} = P_{k+1/k} H_{k+1}^T [H_{k+1} P_{k+1/k} H_{k+1}^T - R_{k+1}]^{-1}. \quad \text{(eq. 45)}$$

State Correction

Following each measurement update, the states can be corrected using current estimates (e.g., best estimates) of the errors. In this situation, the predicted state errors become zero:

$$x_{k+1/k} = 0. \quad \text{(eq. 46)}$$

F. Initialization of the Survey Tool on a Moving Surface

In certain circumstances, the apparatus 10 may be positioned on a moving surface. For example, the apparatus 10 may be on an off-shore drilling rig or platform. The continuous survey mode will generally operate properly on the Earth under such conditions, provided some means of initializing the integration process involved, other than gyro-compassing, can be established. For example, given some independent means of keeping track of the substantially instantaneous attitude of a moving platform, and the dynamic transfer of that information to the survey tool to initialize the continuous survey process, the potential exists to remove the survey uncertainties associated with platform motion. It can therefore be beneficial to maintain a dynamic orientation (e.g., reference attitude) on the moving surface (e.g., a rig) which can be initialized at a particular moment. For example, the orientation (e.g., reference attitude or azimuth) of the survey tool 30 with respect to the reference direction 18 can be determined and/or transferred to the survey tool 30 generally immediately before the tool is placed in continuous survey mode (e.g., upon insertion of the survey tool 30 into the wellbore) in accordance with certain embodiments. In certain embodiments, the directional reference system 16 and/or the inertial navigation system 42 may be used to conduct the determination, transfer the information regarding the orientation to the survey tool 30, or both, as described herein (e.g., with respect to FIG. 6).

In some other embodiments, the motion of the drilling rig or platform may be advantageously used to initialize the survey tool 30. For example, an angular rate measurement matching procedure may be used to determine the relative orientation (e.g., attitude and/or azimuth) between two orthogonal sets of axes on the platform structure (e.g., between a set of axes defined by the inertial navigation system 42 and a set of axes defined by the survey tool 30). Such a procedure may account for relative differences between the orientation of the survey tool 30 and the apparatus 10. In general, as described herein, initialization of the survey tool 30 using the apparatus 10 can be achieved accurately where the wellbore survey tool 30 is mounted in some predetermined orientation with respect to the apparatus 10 or components thereof (e.g., the directional reference system 16). Thus, the accuracy of the determination of the orientation of the survey tool 30 may be improved when the alignment of the survey tool 30 (e.g., attitude) with respect to the apparatus 10 is relatively accurate and/or precise. Using the angular rate matching process described herein, residual misalignments between the survey tool 30 and the apparatus 10 may be determined such that actual mounting alignment accuracy of the survey tool 30 on the apparatus 10 becomes less critical.

Examples of a generally similar angular rate matching procedure used to produce precision alignment in attitude and corresponding systems for aligning a weapons system on a sea-borne vessel are described in U.S. Pat. No. 3,803,387, entitled "Alignment Error Detection System," which is hereby incorporated in its entirety by reference herein. By comparing the sets of angular rate measurements (e.g., from the inertial navigation system 42 and the survey tool 30), it is possible to deduce the relative orientation of the two sets of axes (e.g., o the apparatus 10 and the survey tool 30). The orientation of the apparatus 10 (which may be referred to as the platform reference frame) may be defined by the orientation of the inertial navigation system 42, an integrated device 43 (e.g., an integrated GPS/AHRS unit), or the directional reference system 16.

In an offshore drilling or platform, for example, the rocking motion of the rig is generally sufficient to provide angular motion sufficient to allow the attitude determination. Accurate knowledge of the inertial navigation system 42 reference orientation with respect to the geographic reference frame (e.g., the reference direction 18), combined with knowledge of the relative orientation (e.g., attitude and/or azimuth) between the survey tool 30 and the inertial navigation system 42 according to an angular rate matching procedure, can allow for accurate determination of the orientation (e.g., attitude and/or azimuth) of the survey tool 30 with respect to the geographic reference frame (e.g., the reference direction 18). Advantageously, utilizing the angular rate matching procedure, the initial orientation of the survey tool 30 can be accurately obtained in situations where the tool 30 is physically misaligned with respect to the platform reference system (e.g., due to operator error in mounting the tool, misalignment due to imprecision in the manufacturing/assembly of the platform, etc.). In certain embodiments, the directional reference system 16, or an integrated unit comprising a directional reference system 16 and an inertial navigation system 42 (e.g., GPS/INS unit 43), is used instead of or in addition to the inertial navigation system 42 in the angular rate matching procedure.

Figure 10:
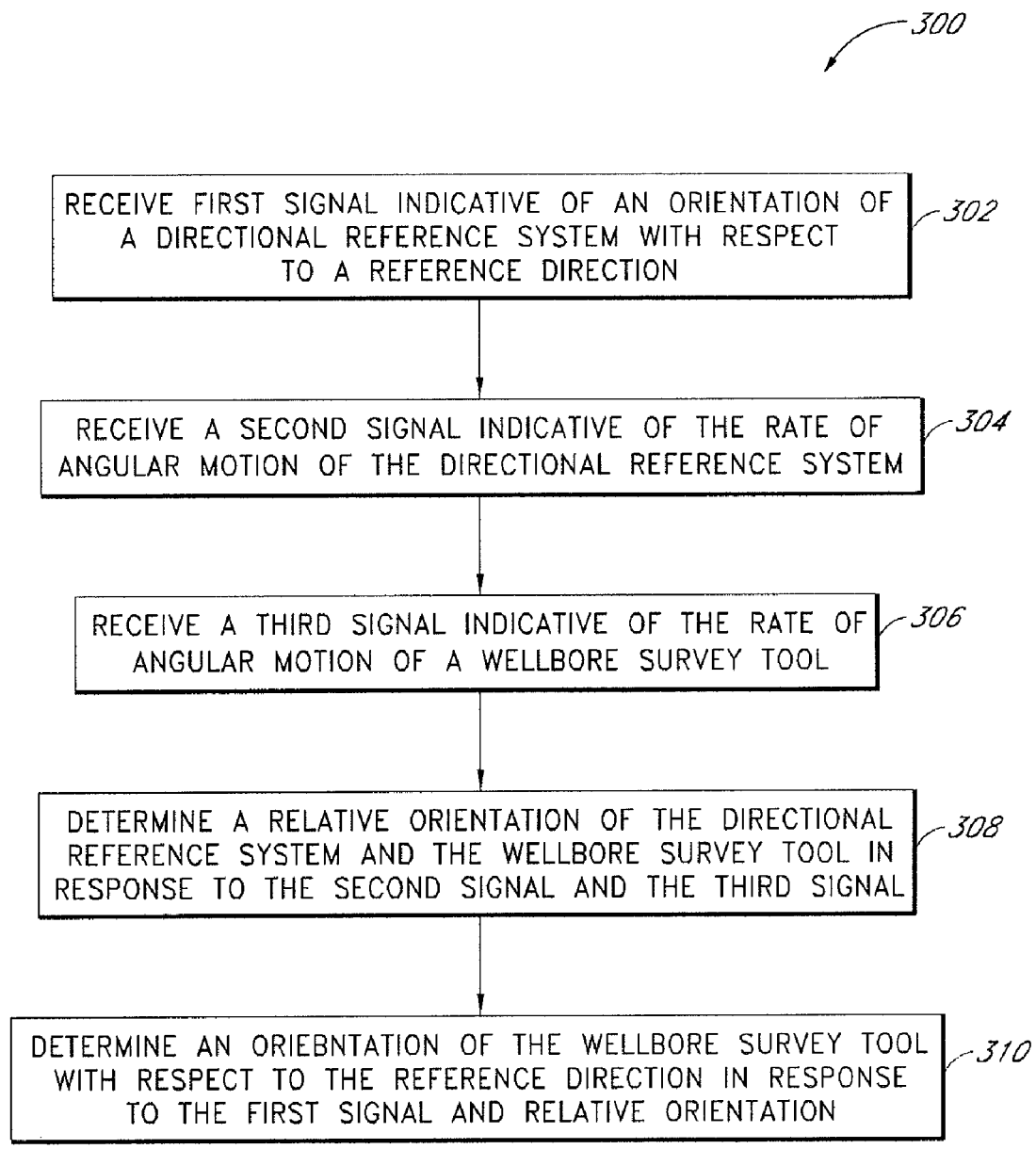
FIG. 10 is a flowchart of an example method of initializing a wellbore survey tool utilizing an angular rate matching procedure in accordance with certain embodiments described herein.

FIG. 10 is a flowchart of an example method 300 of initializing a wellbore survey tool 30 utilizing an angular rate matching procedure. While the method 300 is described herein by reference to the apparatus 10 described with respect to FIGS. 2-8, other apparatus described herein can also be used (e.g., the apparatus 400 of FIG. 10). At operational block 302, the method 300 comprises receiving a first signal indicative of an orientation of a directional reference system 16 with respect to a reference direction 18. For example, the orientation of the directional reference system 16 may be calculated by a processor of the directional reference system 16 in response to signals received by the first antenna 22 and the second antenna 24 as described herein. The first signal may be generated by the directional reference system 16 and transmitted for processing (e.g., to the computing system 52 or directly to the wellbore survey tool 30). In certain embodiments, the method 300 further comprises positioning the wellbore survey tool 30 such that the wellbore survey tool 30 has a predetermined orientation with respect to the directional reference system 16. For example, the wellbore survey tool 30 may be positioned substantially parallel with the directional reference system 16 on the apparatus 10 (e.g., using a tool positioning element as described herein).

The method 300 further comprises receiving a second signal indicative of the rate of angular motion of the directional reference system 16 at operational block 304. For example, in certain embodiments, one or more sensors (e.g., one or more gyroscopes) of the inertial navigation system 42 measure the rate of angular motion of the inertial navigation system 42 and generate the second signal indicative of the same. The inertial navigation system 42 may then transmit the second signal for processing (e.g., to the computing system 52 or directly to the wellbore survey tool 30). In certain other embodiments, the rate of angular motion is measured directly by the directional reference system 16. In one embodiment, apparatus 10 comprises an integrated system, such as the integrated GPS/AHRS unit 43. In such an embodiment, because the directional reference system 16 is integrated with the inertial navigation system 42, the GPS/AHRS unit 43 generates the second signal.

At operational block 306, the method 300 comprises receiving a third signal indicative of the rate of angular motion of a wellbore survey tool 30. For example, one or more sensors of the survey tool 30 (e.g., one or more gyroscopes) may measure the rate of angular motion of the survey tool 30 and generate the third signal. The third signal may then be transmitted for processing (e.g., to the computing system 52 or directly to the wellbore survey tool 30).

The method 300 can further comprise determining a relative orientation of the directional reference system 16 and the wellbore survey tool 30 in response to the second signal and the third signal at operational block 308. For example, the relative orientation can be determined using an angular rate matching procedure described herein. At operational block 310, the method 300 of certain embodiments comprises determining an orientation of the wellbore survey tool 30 with respect to the reference direction 18 in response to the first signal and the relative orientation. Given the orientation of the directional reference system 16 with respect to the reference direction 18, as indicated by the first signal, and given the relative orientation of the survey tool 30 to the directional reference system 16, as indicated by the angular rate matching procedure, such a determination can be made.

In certain embodiments, the second signal may be indicative of the rate of angular motion of the inertial navigation system 42, or of generally the entire apparatus 10 or components thereof (e.g., the base portion 12), instead of, or in addition to the directional reference system 16. For example, in one embodiment, the second signal is generated by the inertial navigation system 42 and is directly indicative of the orientation of the inertial navigation system 42 with respect to the reference direction 18. For example, the inertial navigation system 42 may be oriented in substantially the same orientation on the apparatus 10 with respect to the survey tool 30 as the directional navigation system 16 is oriented with respect to the survey tool 30 and is therefore at least indirectly indicative of the orientation of the directional reference system 16 with respect to the reference direction 18.

G. Example Angular Rate Matching Filter for the Transfer of Orientation Data (e.g., Attitude and Heading Reference Data) to the Survey Tool on a Moving Platform As described, in some embodiments, the apparatus 10 includes an integrated unit, such as a GPS/AHRS reference system 43 generally including the functionality of both a directional reference system 16 and an inertial navigation system 42. On a moving apparatus 10 (e.g., a moving platform or board), the azimuth difference between the survey tool 30) GPS/AHRS reference system 43 and the survey tool 30 may be determined by comparing angular rate measurements provided by the two systems, provided that the drilling rig exhibits some rocking motion. For example, the measurements may be processed using a Kalman filter based on an error model of an inertial system in the survey tool 30. One form of the measurement equation is expressed below. In certain other embodiments, as described herein, separate directional reference system 16 and inertial navigation system 42 are used. Such embodiments are also compatible with the example described herein. For example, in one embodiment, the directional reference system 16 and the inertial navigation system 42 comprise separate units but are substantially aligned with respect to each other on the apparatus 10.

The measurements of turn rate provided by the GPS/AHRS reference system 43 and survey tool 30 system can be assumed to be generated in local co-ordinate frames denoted a and b respectively. In certain embodiments, the rates sensed by a triad of strap-down gyroscopes mounted at each location with their sensitive axes aligned with these reference frames may be expressed as $\omega^a$ and $\omega^b$. The measurements provided by the gyroscopes in the reference and aligning systems are resolved into a common reference frame, the a-frame for example, before comparison takes place.

Hence, the reference measurements may be expressed as:

$$z = \omega^a, \quad \text{(eq. 47)}$$

assuming the errors in the measurements are negligible. The estimates of these measurements generated by the survey tool 30 system are denoted by the ^ notation.

$$\hat{z} = \hat{C}_b^a \hat{\omega}^b. \quad \text{(eq. 48)}$$

The gyroscope outputs ($\hat{\omega}^b$) may be written as the sum of the true rate ($\omega^b$) and the error in the measurement ($\delta\hat{\omega}^b$) while the estimated direction cosine matrix may be expressed as the product of a skew symmetric error matrix, $[I-\phi x]$, and the true matrix $C_b^a$ as follows:

$$\hat{z} = [I-\phi x]C_b^a[\omega^b + \delta\omega^b]. \quad \text{(eq. 49)}$$

Expanding the right hand side of this equation and ignoring error product terms gives:

$$\hat{z} = C_b^a \omega^b - \phi \times C_b^a \omega^b + C_b^a \delta\omega^b. \quad \text{(eq. 50)}$$

The measurement differences may then be written as:

$$\delta z = z - \hat{z} = -[C_b^a \omega^b] \times \Phi - C_b^a \delta\omega^b \quad \text{(eq. 51)}$$

The measurement differences ($\delta z_k$) at time $t_k$ may be expressed in terms of the error states ($\delta x_k$) as follows:

$$\delta z_k = H_k \delta x_k + v_k, \quad \text{(eq. 52)}$$

where $H_k$ is the Kalman filter measurement matrix which can be expressed as follows:

$$H_k = \begin{bmatrix} 0 & \omega_z & -\omega_y & c_{11} & c_{12} & c_{13} \\ -\omega_z & 0 & \omega_x & c_{21} & c_{22} & c_{23} \\ \omega_y & -\omega_x & 0 & c_{31} & c_{32} & c_{33} \end{bmatrix}, \quad \text{(eq. 53)}$$

where $\omega_x$, $\omega_y$, and $\omega_z$ are the components of the vector $C_b^a \omega^b$, $c_{11}$, $c_{12}$, ... etc. are the elements of direction cosine matrix $C_b^a$ and $v_k$ is the measurement noise vector. This represents the noise on the measurements and model-mismatch introduced through any flexure of the platform structure that may be present.

A Kalman filter may be constructed using the measurement equation and a system equation of the form described above in relation to the attitude matching filter. The filter provides estimates of the relative orientation of the platform reference (e.g., the GPS/AHRS reference system 43) and the survey tool 30.

H. Alternative Embodiments

Figure 11:
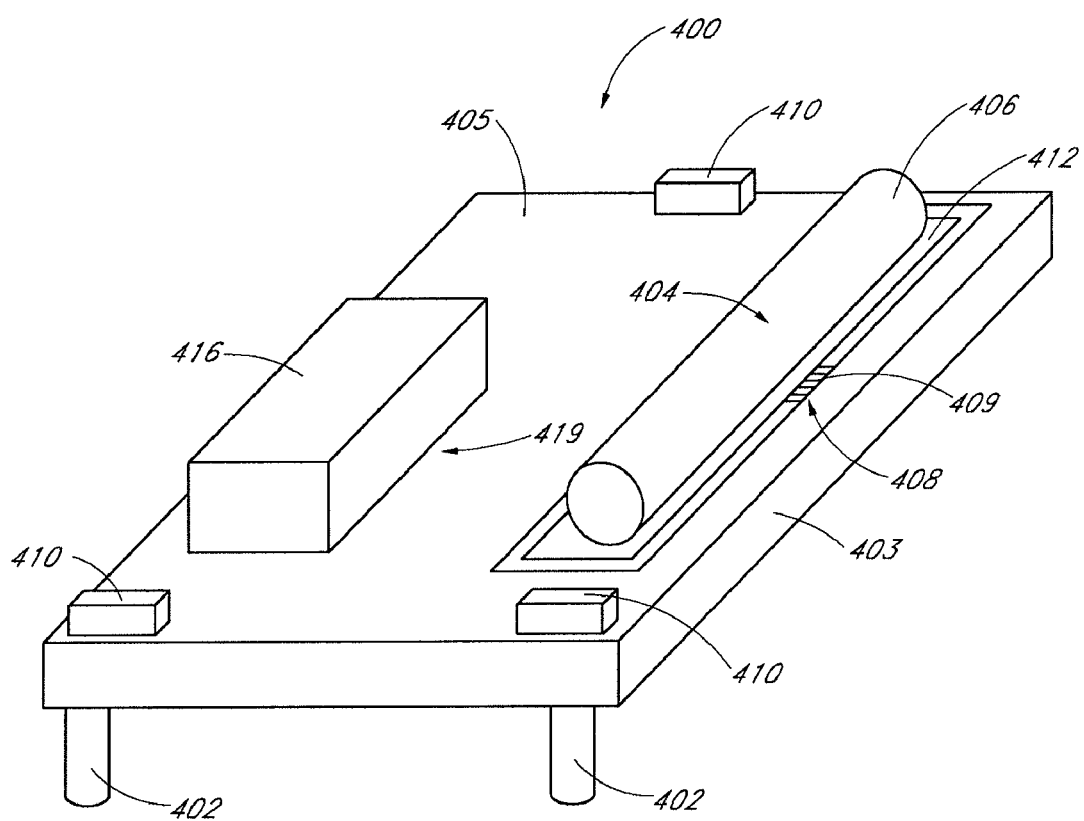
FIG. 11 schematically illustrates an example apparatus for moving a wellbore survey tool in accordance with certain embodiments described herein.

FIG. 11 schematically illustrates an example apparatus 400 for moving a wellbore survey tool. The apparatus 400 of FIG. 11 is configured to transport the survey tool 30 along a surface beneath the apparatus 400. In certain embodiments, the apparatus 400 is configured to be mechanically coupled to at least one directional reference system 416 (e.g., on the apparatus 400 itself or on a platform configured to be removably coupled to the apparatus 400). In this way, certain embodiments advantageously decouple the transportation functionality from the orientation-determination functionality.

The apparatus 400 of certain embodiments comprises at least one support 402 and a base portion 403 mechanically coupled to the at least one support 402. The apparatus 400 can further comprise a tool receiving portion 404 mechanically coupled to the base portion 403 and configured to receive a wellbore survey tool 406. The apparatus 400 may also comprise at least one member movably coupled to a portion of the apparatus 400 and configured to allow the apparatus to move along a surface beneath the apparatus 400. The apparatus 400 can further comprise a tool positioning element 408 configured to controllably move the wellbore survey tool 406 between a first position relative to the apparatus and a second position relative to the apparatus 400.

As shown in FIG. 11, the base portion 403 may comprise a substantially rigid, generally rectangular platform structure including a generally planar surface 405. In other embodiments, the base portion 12 may have a different shape (e.g., circular, ovular, trapezoidal, etc.), may be somewhat flexible, and/or may include one or more inclined surfaces, declined surfaces, stepped portions, etc. The base portion 403 may be similar to the base portion 12 of the apparatus 10 described above (e.g., with respect to FIG. 2 and FIG. 4), for example.

The at least one support 402 may comprise one or more posts. The apparatus 400 of FIG. 11 comprises three supports 402. In other embodiments, there may be more or less supports 402 and/or the supports 402 may be shaped differently (e.g., as rectangular posts, blocks, hemispherical protrusions, etc.). In various embodiments, the at least one support may be similar to the at least one leveler 48 of the apparatus 10 described above (e.g., with respect to FIG. 4).

The tool receiving portion 404 of certain embodiments comprises an area of the base portion 403 on which the well survey tool 406 is mounted. In various embodiments, the survey tool 406 can be releasably secured to the tool receiving portion 404. In certain embodiments, the tool receiving portion 403 is similar to the second mounting portion 20 of the apparatus 10 described above (e.g., with respect to FIG. 2).

The surface beneath the apparatus 400 may be the Earth's surface, a rig surface, etc. In certain embodiments, the at least one member comprises a wheel, tread, ski, or other mechanism configured to allow for movement of the apparatus 400 along the surface. In some embodiments, for example, the at least one member of the apparatus 400 is similar to the at least one member of the apparatus 10 described above (e.g., with respect to FIG. 4).

The tool positioning element 408 can be configured to controllably move the wellbore survey tool 406 between a first position relative to the apparatus 400 and a second position relative to the apparatus 400. In certain embodiments, the first position is horizontal with respect to the base portion 403 and the second position is vertical with respect to the base portion 403. The tool positioning element 408 may be similar to the tool positioning element 56 of the apparatus 10 described above (e.g., with respect to FIGS. 6A-6C) in certain embodiments.

The apparatus 400 may further comprise a mounting portion 414 mechanically coupled to the base portion 403 and configured to receive at least one directional reference system 416. The at least one directional reference system 416 can be configured to provide data (e.g., attitude or azimuth) indicative of an orientation of the at least one directional reference system 416 with respect to a reference direction. In certain embodiments, the mounting portion 414 is similar to the first mounting portion 14 of the apparatus 10 described above (e.g., with respect to FIG. 2).

The directional reference system 416 may be similar to the directional reference system 16 described above (e.g., with respect to FIG. 2). For example, the at least one directional reference system 416 comprises at least one signal receiver of a global positioning system (GPS). For example, the directional reference system 16 may comprise a first antenna 418 and a second antenna 420 spaced apart from the first antenna and defining a line 422 from the first antenna 418 to the second antenna 420. In certain embodiments, the at least one signal receiver further comprises a processor (not shown) configured to receive signals from the first and second antennae 418, 420 and to determine an orientation of the line 422 (e.g., attitude or azimuth) with respect to the reference direction 424.

In certain embodiments, the tool receiving portion 408 is configured to receive the wellbore survey tool 406 such that the wellbore survey tool 406 has a predetermined orientation with respect to the at least one directional reference system 416. This general configuration may be similar the one described above (e.g., with respect to FIG. 2) for the apparatus 10, the wellbore survey tool 30, and the directional reference system 16, for example. In addition, the survey tool 406 of certain embodiments may be similar to the survey tool 30 described above (e.g., with respect to FIG. 2).

The apparatus 400 of certain embodiments may further include one or more of components described herein, such as an inertial navigation system and/or computing system similar to the inertial navigation system 42 and computing system 52 of the apparatus 10 described above (e.g., with respect to FIG. 4).

I. Remote Reference Source

Certain embodiments described above include methods and apparatus for initializing a wellbore survey system using an external directional reference system such as a satellite navigation system (GPS/GLONASS). One of the methods described generally involves mounting both the satellite reference system (e.g., comprising 2 or more antennae, receivers and processor) and the survey tool on a stable platform in a known orientation with respect to one another and transferring attitude data from the reference system to the tool. Thereafter, the tool is switched to a continuous survey mode allowing its orientation to be tracked during pick-up of the tool and positioning at the entrance to the well, and throughout the subsequent survey of the well.

In certain cases, screening of the GPS antennae may occur (e.g., by the derrick or other objects). Thus, it can be advantageous to mount the GPS well away from the derrick and so have a sufficient number of satellites in view. However, it can also be desirable to mount the survey tool in close proximity to the well head/Kelly bushing (e.g., near to the entrance to the wellbore) so as to avoid having to transport the tool to this location after initialization. Survey errors can propagate throughout the period of tool surface handling—therefore it is often desirable to keep this to a minimum duration. Further, there is a possibility of exceeding the dynamic range of the sensors in the tool, e.g. of saturating the gyroscopes by exceeding maximum allowable input rate. If this occurs, the attitude reference stored in the tool at initialization will be lost and the procedure of aligning the tool to the GPS reference will need to be repeated. Thus, there can be a tension between these two design goals: performing initialization using GPS measurements on the rig and positioning the tool close to the well head/Kelly bushing tool to minimize the surface handling requirement.

To address the competing design goals described above, certain methods described herein involve mounting the GPS equipment and the survey tool remote from one another during the initialization process. For example, the GPS equipment can be mounted well away from the derrick (e.g., in order to maximize the number of satellites in view) and the tool may be located close to the entrance to the well (e.g., in order to minimize or otherwise reduce the movement of the tool prior to running into the well and/or the time taken in any physical transfer of the tool between two locations). In certain embodiments, the initial orientation of the wellbore survey tool is determined with respect to a chosen reference frame (e.g., the local vertical geographic frame expressed as an azimuth angle, an inclination, and a high-side orientation of the wellbore survey tool). In certain embodiments described herein, the directional reference system and the wellbore survey tool are not mechanically coupled to one another and are mounted on respective surfaces that are not mechanically coupled to one another.

Figure 12:
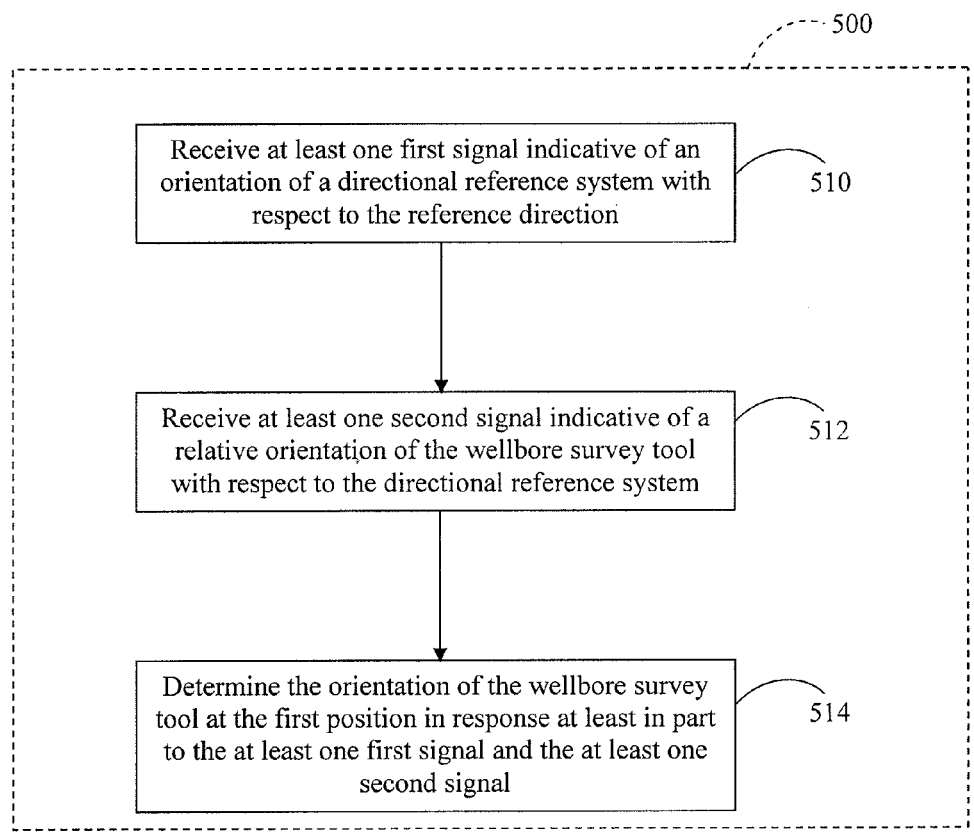
FIG. 12 is a flowchart of an example method for determining an orientation of a wellbore survey tool at a first position with respect to a reference direction in accordance with certain embodiments described herein.

FIG. 12 is a flowchart of an example method 500 for determining an orientation of a wellbore survey tool at a first position with respect to a reference direction in accordance with certain embodiments described herein. In an operational block 510, the method 500 comprises receiving information (e.g., at least one first signal) indicative of an orientation of a directional reference system with respect to the reference direction. The directional reference system is positioned at a second position spaced from the first position. In an operational block 512, the method 500 further comprises receiving information (e.g., at least one second signal) indicative of a relative orientation of the wellbore survey tool with respect to the directional reference system. In an operational block 514, the method 500 further comprises determining the orientation of the wellbore survey tool at the first position in response at least in part to the received information (e.g., the at least one first signal and the at least one second signal).

In certain embodiments, the at least one first signal and the at least one second signal are received by a computer system comprising one or more computer processors (e.g., one or more computer microprocessors). For example, the one or more computer processors can comprise one or more processors of the wellbore survey tool, the directional reference system, or one or more processors that are dedicated to determining the orientation of the wellbore survey tool. Additional information, such as parameter values (e.g., distance between two reference points on the wellbore survey tool, distance between two reference points on the directional reference system, distance between the wellbore survey tool and the directional reference system, and horizontal and vertical components of these distances) that are directly or indirectly representative of one or more dimensions or geometric relationships of or between the wellbore survey tool and the directional reference system (e.g., angle between lines linking reference points and axes of tool and GPS reference directions) may also be used in determining the orientation of the wellbore survey tool, and such parameter values are received by the one or more processors which are used to calculate the orientation of the wellbore survey tool. In certain embodiments, the one or more computer processors comprise one or more inputs to receive data (e.g., information or one or more signals) indicative of (e.g., to be used to compute) the orientation of the directional reference system with respect to the reference direction and indicative of the relative orientation of the wellbore survey tool with respect to the directional reference system.

In certain embodiments, the computer system further comprises a memory subsystem adapted to store information (e.g., one or more signals or parameter values) to be used in the determination of the orientation of the wellbore survey tool. The computer system can comprise hardware, software, or a combination of both hardware and software. In certain embodiments, the computer system comprises a standard personal computer. In certain embodiments, the computer system comprises appropriate interfaces (e.g., modems) to receive and transmit signals as needed. The computer system can comprise standard communication components (e.g., keyboard, mouse, toggle switches) for receiving user input, and can comprise standard communication components (e.g., image display screen, alphanumeric meters, printers) for displaying and/or recording operation parameters, orientation and/or location coordinates, or other information used in determining the orientation or generated as a result of determining the orientation. In certain embodiments, the computer system is configured to read a computer-readable medium (e.g., read-only memory, dynamic random-access memory, flash memory, hard disk drive, compact disk, digital video disk) which has instructions stored thereon which cause the computer system to perform a method for determining an orientation of the wellbore survey tool in accordance with certain embodiments described herein. In certain embodiments, at least one signal of the at least one first signal and the at least one second signal is received from user input, computer memory, or sensors or other components of the system configured to provide signals having the desired information.

Techniques are also described herein for transferring the attitude reference defined by the GPS to a location physically removed from it (e.g., the tool location). In certain embodiments, the wellbore survey tool is at a first position spaced a first distance from the wellbore entrance (e.g., spaced a first distance from the well head/Kelly bushing) and the directional reference system is at a second position spaced a second distance from the wellbore entrance (e.g., spaces a second distance from the well head/Kelly bushing), with the second distance being greater than the first distance. In certain embodiments, the first distance has a first horizontal component that is less than 10 feet, or the second distance has a second horizontal component that is greater than the first horizontal component by at least about 30 feet, or both. In certain embodiments, the first distance has a first vertical component that is less than about 20 feet.

In some cases, the horizontal separation distance between the first position and the second position could be as much as 50 feet, and the two positions could be at different levels on the rig (also up to 50 feet). In other configurations, the horizontal and vertical separation distances can vary. For example, in various configurations, the horizontal and/or vertical separation distances may range from between about 10 and 1000 feet, may be at least 10, 15, 20, 25, 30, 35, 40, 45, 50, 55, 60, 65, 70, 75, 80, 85, 90, 95, 100, 1000 feet, or may be some value greater than 1000 feet. For example, in certain such embodiments, the GPS equipment (or other directional reference system) and the survey tool are separated by a distance beyond a distance for which it is physically easy or straightforward to have the GPS equipment and the survey tool mechanically connected to one another. Moreover, in some cases, the survey tool and the GPS equipment are mounted during the initialization process such that they are not mechanically coupled to one another, are mounted on respective surfaces that are not mechanically coupled to one another, or both.

In certain embodiments, the information (e.g., the at least one first signal) indicative of an orientation of the directional reference system with respect to the reference direction is generated or provided by the directional reference system itself. For example, the directional reference system can generate one or more signals based on the orientation of the directional reference system, and can input the one or more signals to the one or more computer processors.

Furthermore, a number of methods are described herein generate the information (e.g., the at least one second signal) indicative of the relative orientation of the wellbore survey tool with respect to the directional reference system e.g., using either (i) laser/optical sighting between the GPS reference equipment and the tool or (ii) the application of an inertial attitude reference system. In both cases, the survey tool may be mounted vertically, horizontally, or anywhere in between during the attitude initialization process. Provided the tool can be physically located close to the entrance to the well at this time, any need to move the tool over a significant distance following GPS attitude initialization is avoided or reduced and the time for attitude errors to propagate before the start of a wellbore survey is therefore reduced. If the tool can be held close to vertical during this process, the need to rotate the tool before insertion in the well is also avoided or reduced. Therefore, by holding the survey tool vertical close to the wellbore entrance (e.g., the well head/Kelly bushing) throughout the initialization process, attitude errors which would grow and contribute to the overall attitude error at the start of a survey may be kept to a minimum or are otherwise significantly reduced. Techniques are described here which address these issues.

It is desirable to accurately determine, the full attitude of the survey tool, e.g., the azimuth, inclination and high side orientation with respect to the chosen reference frame (the local vertical geographic frame for example). It is therefore desirable for the attitude reference to be capable of defining fully the attitude of the tool for initialization purposes, particularly for operation on a moving offshore platform. It is noted that whilst the inclination and high side angles can be determined very accurately on a stationary platform using the measurements provided by the accelerometers installed in the tool, this approach is less reliable offshore, and may not produce accurate results.

However, for the purposes of illustrating and providing a clear (flat page) visualization of the techniques described below, single plane illustrations are given, and attention is focused on the determination of tool orientation with respect to true north which is used as the tool azimuth angle. In the event that the tool is mounted at, or close to, the local vertical, it is desirable to determine the direction of a lateral axis of the tool (usually the y-axis) with respect to north. The direction of the projection of this lateral axis on the horizontal plane, with respect to north, is commonly referred to as the gyro tool face angle.

It is stressed that some or all of the methods described herein may be adapted and used to define the attitude of the survey tool completely, and made to work irrespective of the orientation of the survey tool. In such cases, the system geometry will become more complex and additional measurements may be taken and used to extract full attitude data.

1. Optical Sighting Procedures

Figure 13:
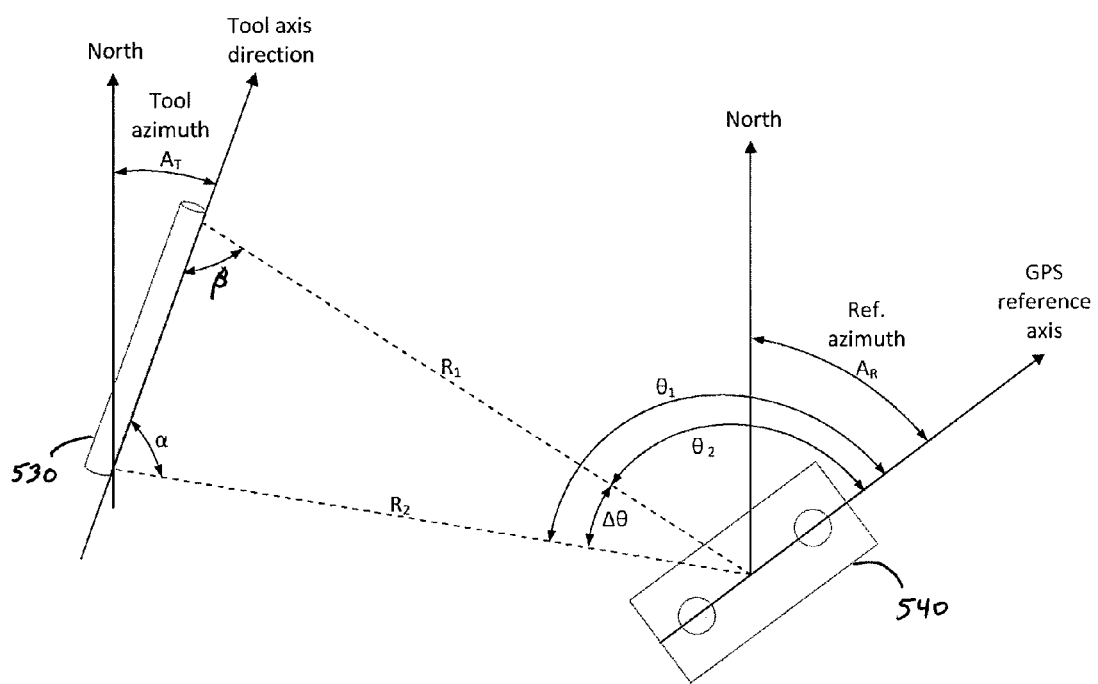
FIG. 13 illustrates an example survey tool initialization configuration including a survey tool and a reference system and also illustrates a corresponding initialization process, according to certain embodiments described herein.

In certain embodiments, one or more optical sighting procedures are used to generate information (e.g., the at least one second signal) indicative of the relative orientation of the wellbore survey tool 530 with respect to the directional reference system 540. FIG. 13 illustrates an example wellbore survey tool/directional reference system arrangement and corresponding initialization process that may be implemented when the survey tool 530 is horizontal. A theodolite and a ranging device (not shown) mounted on the platform containing the satellite antennae provides measurements of the line of sight to two points marked at a known spacing along the tool casing. Together with measurements of the ranges to each of these points, it is possible to define fully the triangle formed by the location of the theodolite and two known points on the casing of the tool 530. Given this information, the direction in which the tool is pointing with respect to north (the tool azimuth) may be calculated using the geometric relationships shown in FIG. 13. For example, the reference azimuth ($A_R$) can be determined using the directional reference system 540 (e.g., satellite reference system), and angles $\theta_1$ and $\theta_2$ and distances $R_1$ and $R_2$ can be measured. Angles α and β can be computed, which are functions of measured distances $R_1$ and $R_2$ and the difference Δθ between angles $\theta_1$ and $\theta_2$. The tool azimuth can then be computed using $A_T=A_R-\theta_1-\alpha+180$ or $A_T=A_R-\theta_2+\beta$.

The accuracy of the process described may be limited by the ability to site on to the appropriate points on the survey tool casing, but may be enhanced by taking multiple measurements at known spacing along the casing. By this method some redundancy is introduced into the measurement data, and the measurements may then be processed using a least squares adjustment.

Whilst the procedure and calculation described in FIG. 13 is valid for the situation where the tool is horizontal, the method can be extended to cases in which the tool is mounted in any orientation with respect to the reference frame. In such cases, both the geometrical arrangement and the calculations used to determine the orientation of the tool become more complex, but are within the capability of persons of ordinary skill in the art using the disclosure herein.

Figure 14:
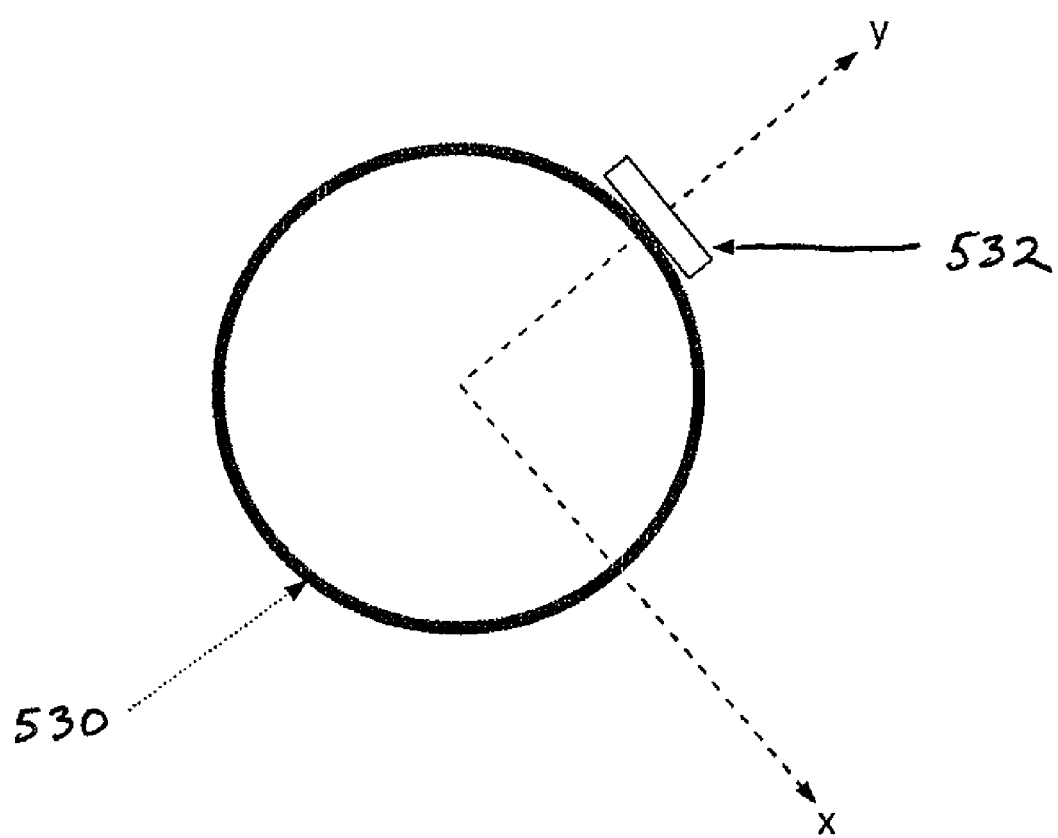
FIG. 14 illustrates an example survey tool mounted vertically and having a mirror attached to the tool, according to certain embodiments described herein.

If the tool were to be mounted vertically, a similar process may be implemented. For example, the orientation of a mirror 532 attached to the tool 530 aligned perpendicular to a known axis (e.g., the y-axis as depicted in FIG. 14) may be determined. The angle measured with respect to a reference direction and the angle of the reference direction with respect to north may then be summed to determine the gyro tool face angle. According to this approach, it is desirable to accurately align and position the mirror 532 with respect to the axes of the survey tool 530. A method of achieving this alignment is described below.

Figure 15:
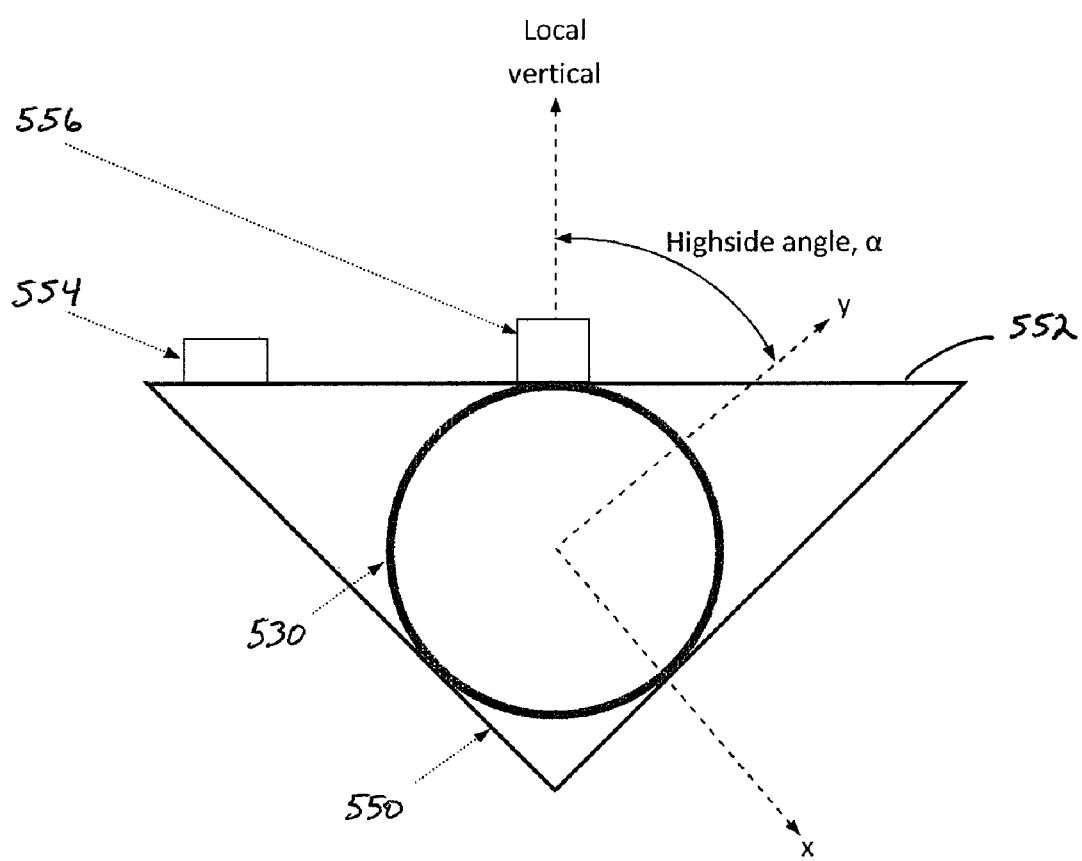
FIG. 15 illustrates an example survey tool mounted horizontally in a v-block mount, according to certain embodiments described herein.

The tool 530 can be mounted horizontally in a v-shaped channel or block mount(s) 550 and a flat bar 552 can be positioned above the tool 530 as shown in FIG. 15. The bar 552 may be leveled accurately using a level sensor 554 attached to the bar 552. A laser 556 can be positioned on the bar 552 with its beam pointing perpendicular to it, e.g., aligned vertically. Using x and y accelerometer measurements, the tool high side angle can be determined, which corresponds to the angle between the y-axis of the tool 530 and the laser beam direction. For example, the tool high side angle α can be expressed using the x accelerometer measurement ($A_x$) and the y accelerometer measurement ($A_y$) as $\alpha=\tan^{-1}(A_x/A_y)$. If the tool 530 is subsequently lifted to the vertical and the direction of the laser beam with respect to true north can be established, the gyro tool face angle can be determined by simply summing the high side angle, measured when the tool 530 was horizontal, and the beam angle. Thus, in certain embodiments, the tool highside angle is determined while the wellbore survey tool 530 is substantially horizontal (e.g., aligned with the local horizontal using the level sensor), and the wellbore survey tool 530 is then moved to be substantially vertical, and the orientation of the wellbore survey tool 530 at the first position is determined by calculating the gyro tool face angle (e.g., using accelerometer measurements from the wellbore survey tool 530) at least in part based on the determined tool highside angle.

A similar result may be achieved by replacing the laser 556 with a mirror attached to the bar 552 described above. A method of determining the gyro tool face angle is described next with respect to FIGS. 16-18.

Figure 16:
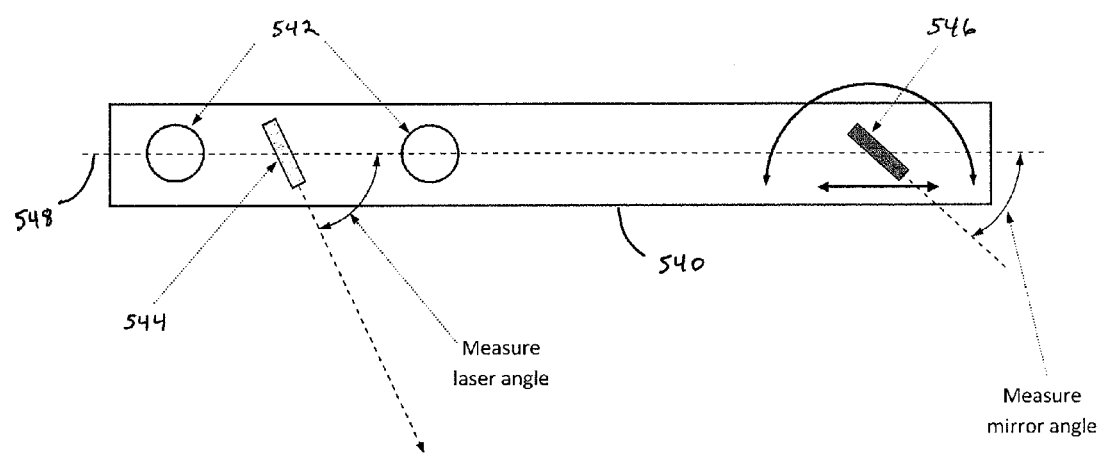
FIG. 16 illustrates an example survey tool initialization configuration in which a reference system is mounted on a platform along with one or more optical sighting instruments, according to certain embodiments described herein.

According to such a method, the satellite antennae 542 of the directional reference system 540 are mounted on a platform as described previously. Also mounted on this platform can be a laser light source 544 coupled with an optical sight and a mirror 546 which can be both rotated and moved along the axis of the platform as depicted in FIG. 16. A motor driven screw mechanism may be used to achieve linear motion of the mirror 546 along the reference axis 548, and a further motor can be incorporated to rotate the tool 530 to the desired angle. The laser beam can be directed or transmitted along a first line extending between the directional reference system 540 and the centre of the reflecting surface of the mirror 532 attached to the survey tool 530, or at a flat surface machined on the casing of the tool 530. The mirror 532 or flat surface on the casing of the tool 530 is at a predetermined orientation with respect to the tool 530, and reflects the incident light. In certain embodiments, the wellbore survey tool 530 at the first position is mounted substantially vertically with respect to the wellbore entrance. In certain embodiments, the mirror 532 is moved to change the direction the light is reflected by the mirror 532, and since the mirror 532 is mechanically coupled to the wellbore survey tool 530, the mirror 532 and tool 530 maintain their relationship with one another while being moved.

The light reflected by the mirror 532 is transmitted along a second line extending between the mirror 532 and a movable mirror 546 on the reference platform. The movable mirror 546 is positioned to intersect the beam reflected from the tool mounted mirror 532 and subsequently rotated in order to reflect or direct the beam back along the axis 548 of the reference platform. The operator or other entity makes the necessary linear and angular adjustments to this mirror 546 to ensure that the returning beam from the tool mounted mirror 532 is directed at a target point alongside the laser source. In certain embodiments, the light reflected by the mirror 546 propagates along a third line extending between the mirror 546 and a portion of the directional reference system (e.g., the light source 544), such that the first line, the second line, and the third line form a triangle.

Figure 17A:
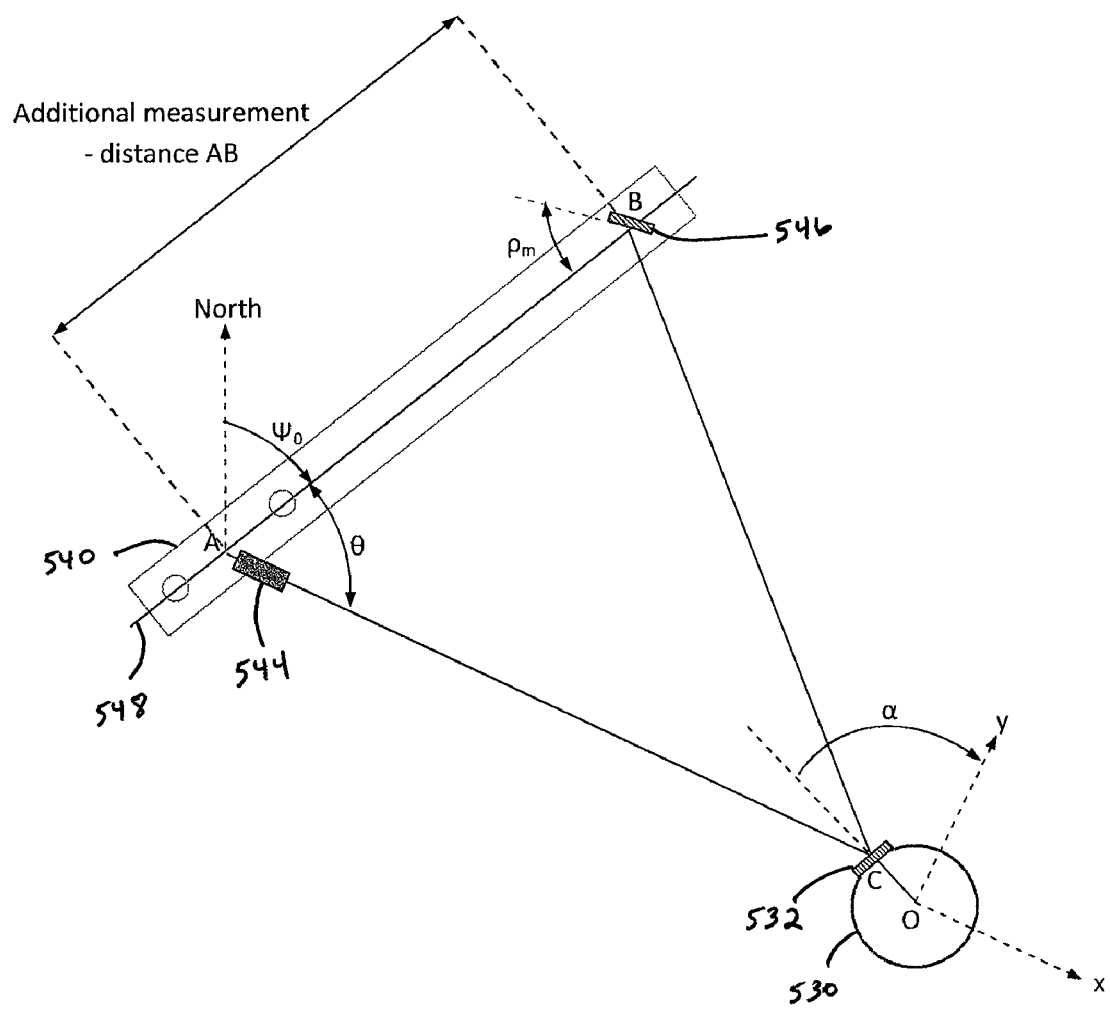
FIGS. 17A and 17B illustrate example initialization configurations in which a reference system is mounted on a platform along with one or more optical sighting instruments and a survey tool, according to certain embodiments described herein.

The resulting triangle (denoted ABC) formed by the light path (A to C to B to A) is shown in FIG. 17A. The geometry of this triangle can be fully defined using the measured angles which are shown in FIG. 17A. Point O denotes the central axis of the survey tool 530, and the lateral axes of the tool Ox and Oy are also shown in FIG. 17A. Other measured angles are the beam angle θ with respect to the azimuth reference, mirror angle $\rho_m$ with respect to the azimuth reference, and the tool y-axis α with respect to the tool mirror axis (corresponding to the measured highside angle). Given knowledge of the reference azimuth axis AB direction with respect to north (defined by the satellite system and corresponding to the reference azimuth angle $\Psi_o$), the internal angles of the triangle ABC and the orientation of the tool axis Oy with respect to the axis of the mirror 532 attached to the tool 530, the orientation of the tool axis Oy with respect to north (the gyro tool face angle) can be determined.

Figure 17B:
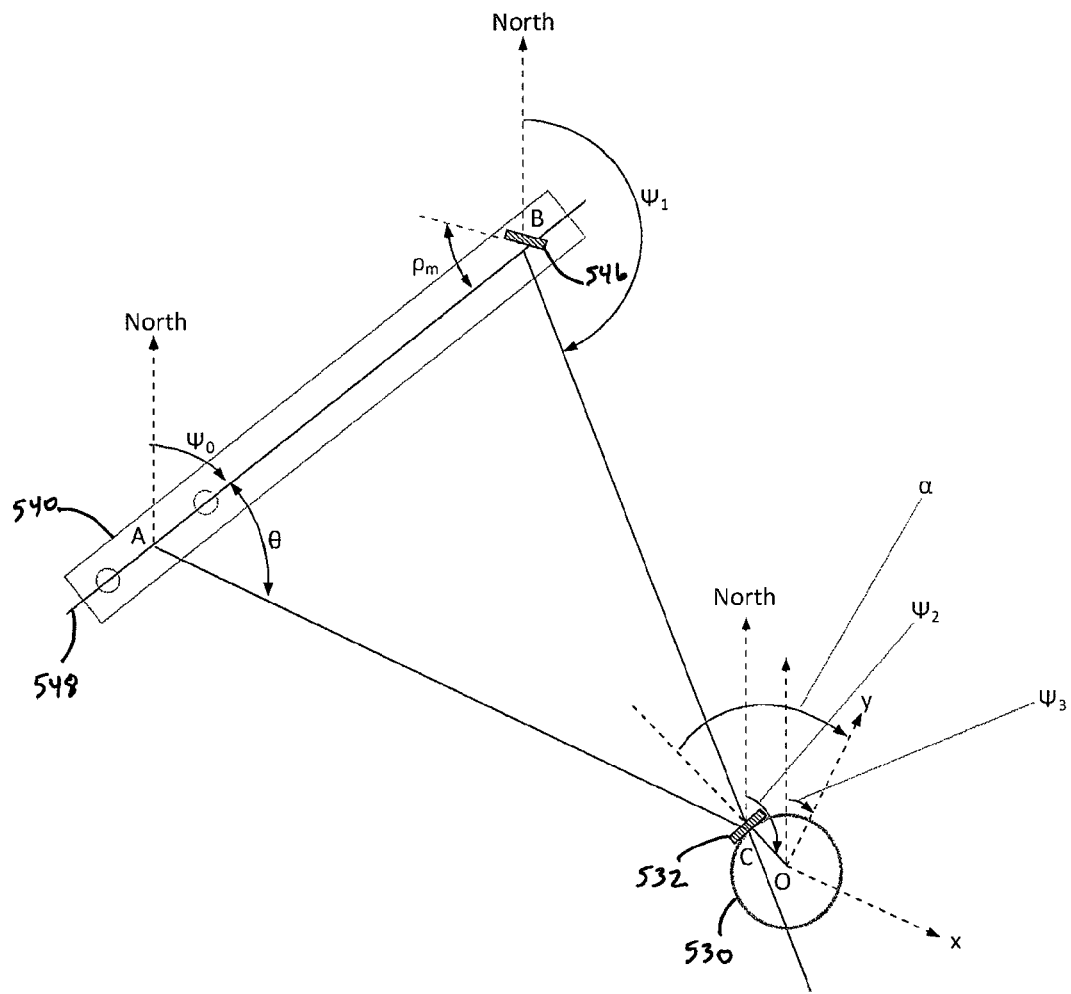

An example sequence of calculations used to establish this angle, using the angles shown in FIG. 17B, is now described. The azimuth reference direction $\psi_0$ is defined by the directional reference system 540, is the direction of line AB with respect to north. The direction of line BC with respect to north, defined by azimuth reference $\psi_0$ and mirror angle $\rho_m$ is given by $\psi_1 = \psi_0 + 2\rho_m$. The direction of line CO with respect to north, defined by $\psi_1$ and measured angle θ, is given by $\psi_2 = \psi_1 + 180 - \rho_m + \theta/2 = \psi_0 + 180 + \rho_m + \theta/2$. The direction of tool axis (Oy) with respect to north (gyro toolface angle), defined by $\psi_2$ and measured highside angle α, is given by $\psi_3 = \psi_2 + \alpha - 360 = \psi_0 + \rho_m + \theta/2 + \alpha - 180$.

Additional geometric measurements may be provided to aid the process defined in FIG. 17B. For example, the distance between the laser source and the movable mirror (AB) may be measured and used in the computational process to determine tool orientation (shown in FIG. 17A). The availability of additional measurement data such as this may be used to advantage to check the accuracy of the computational process and provide quality control, through a least squares adjustment process for example.

Figure 18:
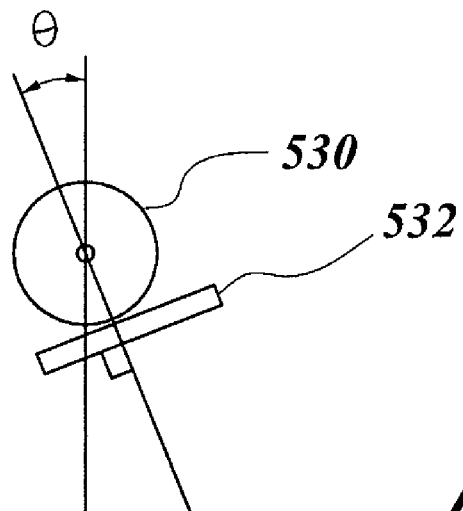
FIG. 18 illustrates an example initialization configuration in which an autocollimation device is mounted at a predetermined orientation with respect to a reference system and is used to determine the initial orientation of the survey tool.
Figure 18:
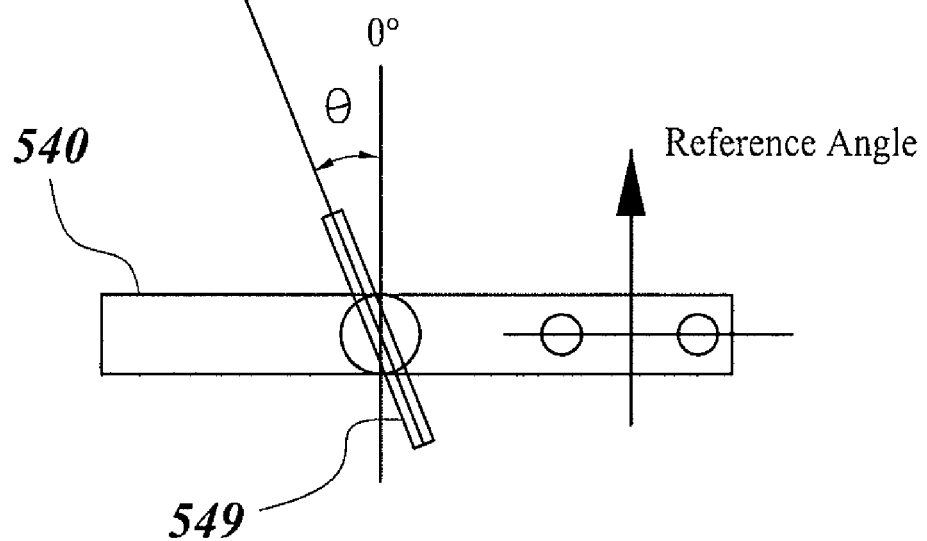

In alternative embodiments and as illustrated in FIG. 18, the gyro tool face angle and/or other parameters can be determined using a mirror 532 attached to the tool 530 (e.g., at the highside point), and an autocollimating head 549 attached to the directional reference system 540 (e.g., a GPS unit or fixture). The autocollimating head 549 and the mirror 532 can then be aligned via a visual sighting, or a light beam, for example. In such an arrangement, it may be desirable that the mirror 532 be locked in the "gyro tool face" plane, but able to be tilted in the inclination plane to allow any differences in height to be accommodated. During the autocollimation process, a beam of light can be sent out through the head 549 and the reflection can be detected coming back onto the eyepiece. In other embodiments, alignment can be determined by detecting that the image of the end of the autocollimating head 549 is in the mirror reflection (e.g., when looking through the eyepiece), indicating that the mirror 532 and head 549 are lined up or substantially lined up with each other.

A further alternative scheme for establishing the instantaneous gyro tool face angle of a survey tool on a moving platform is described next. The following method relies on the accurate surveying of the orientations of two mounting locations on the rig, one for the satellite reference antennae and one for the survey tool, each with respect to a defined platform reference frame. Given that the survey tool is clamped in the defined reference location, and that its orientation relative to the satellite reference system is known to an acceptable level of accuracy, the satellite reference can be transferred to the survey tool and the survey process initiated. In the following description, it is assumed throughout that the rig structure is substantially rigid and that the relative orientations of the mounting locations are therefore substantially unchanging.

The transformations between the various coordinate frames are denoted by direction cosine matrices, viz.

$C_G^R$=coordinate transformation from the local geographic reference (G), defined by the directions of true north, east and the local vertical, and the satellite reference frame (R)—established using the satellite system.

$C_P^R$=coordinate transformation from the platform reference (P) and the satellite reference frame (R)—determined using standard land surveying procedures $C_P^T$=coordinate transformation from the platform reference (P) and the survey tool frame (T)—determined in part using land surveying procedures (orientation of x and y tool axes). The orientation of the tool about its longitudinal (z) axis is more difficult to control, particularly if the oil platform on which the initialization process is taking place is moving. To overcome this concern, the following method can be used.

Figure 19:
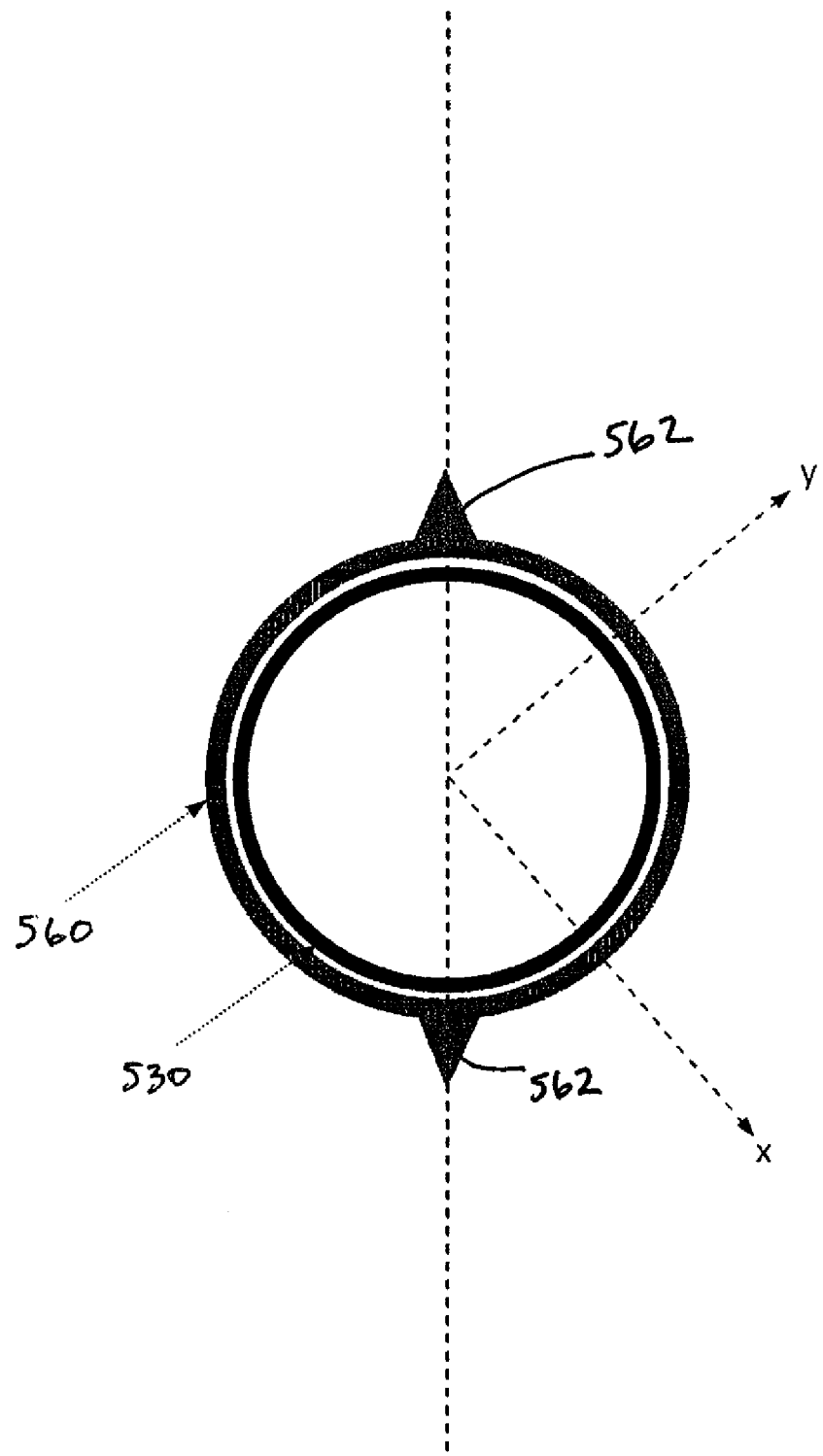
FIG. 19 illustrates an example survey tool initialization configuration in which a sleeve is affixed to a survey tool, according to certain embodiments described herein.
Figure 20:
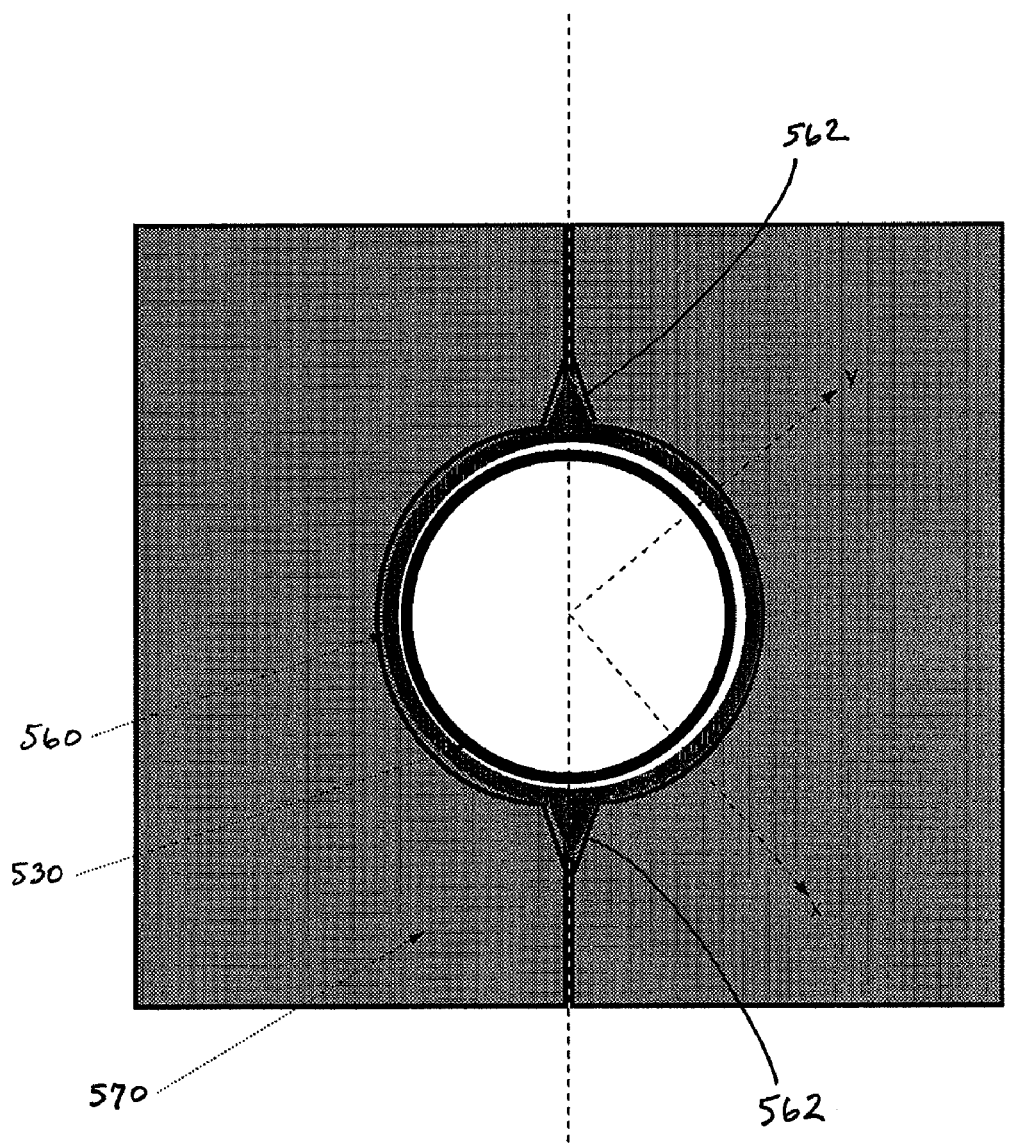
FIG. 20 illustrates another example survey tool initialization configuration in which a sleeve is affixed to a survey tool and the tool/sleeve assembly are keyed into a clamping mechanism, according to certain embodiments described herein.

The high side of the tool 530 can be established to a relatively high degree of accuracy using the tool accelerometer measurements provided that the tool 530 is substantially stationary. Thus, one example method includes determining the tool highside on land (as part of the tool calibration process) and affixing (e.g., clamping) a sleeve 560 to the tool casing with reference structures, e.g., clearly defined protrusions 562, in a known position(s) with respect to the x and y axes of the instrument assembly within the tool—as schematically illustrated in FIG. 19. This sleeve assembly 560 then remains attached to the tool 530 while it is shipped to the offshore platform. The assembly 570 in which the survey tool 530 is to be mounted (e.g., clamped) on the platform can be designed to allow the tool protrusions 562 to key into a corresponding mechanism on the platform to lock the tool 530 in a predetermined orientation about its z-axis, as illustrated in FIG. 20. Thus, in certain embodiments, the wellbore survey tool 530 is mounted at a predetermined orientation with respect to the directional reference system 540 using corresponding keying structures affixed to a mount that is located at the first position.

Other methods of achieving the same or similar result involve the substantially rigid attachment of a cross-over piece to one end of the survey tool, to which a key way can be machined; either a protrusion or an indentation in the crossover, for example.

The attitude of the survey tool with respect to the geographic frame ($C_G^T$) may then be calculated using the following matrix equation:

$$C_G^T = C_G^R C_R^P C_P^T$$

where $C_R^P$ is equal to the transpose of the matrix $C_P^R$.

One object of this particular scheme is to initialize the survey tool 530 while positioned above the well in the derrick, although the method is generally applicable for any tool orientation; vertical to horizontal on the rig. The tool 530 may be fully made up prior to the start of the initialization process, ready to be inserted into the wellbore, and clamped in position at its two ends (e.g., at the ends of tool section containing the instrument assembly). Land surveying techniques may be used to establish the position of the end supports, thus defining the tool orientation about its lateral (x and y) axes with respect to the platform reference axis set. The sleeve assembly 560 attached to the casing of the tool prior to shipment offshore and the clamping assembly 570 on the rig can be used to define the tool orientation about the z-axis.

Figure 21:
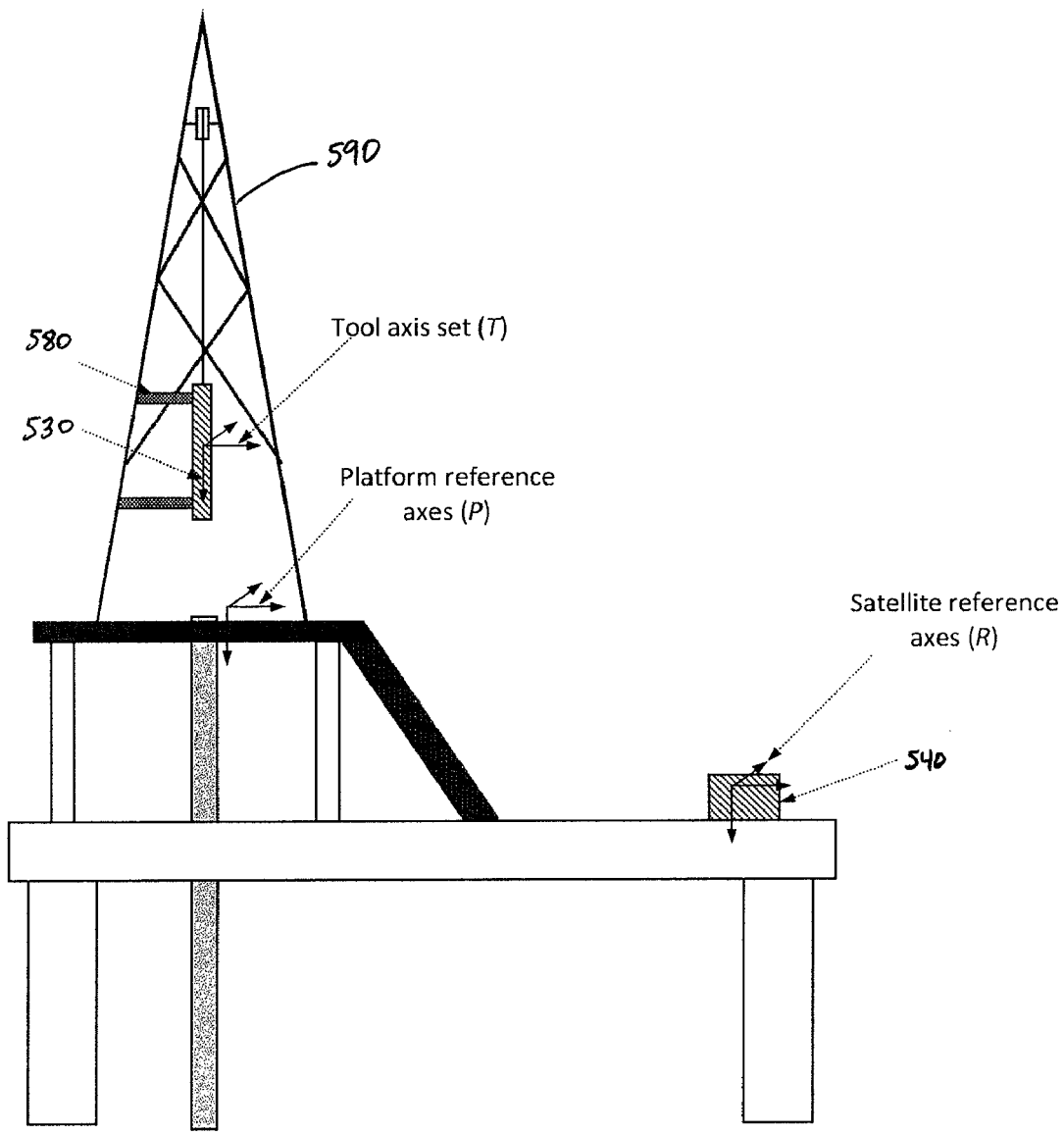
FIG. 21 shows an example rig having a survey tool and reference system mounted thereon, according to certain embodiments described herein.

FIG. 21 shows the example locations of the directional reference system 540 and the survey tool 530 in which the initialization process is to take place. The survey tool 530 can be held by tool initialization support 580 (including clamping assembly 570) of the derrick 590 and spaced away from the directional reference system 540.

2. Methods Involving the Use of an Additional Inertial Reference System

Certain alternative methods for initializing a gyro survey tool 530 are described next. According to some embodiments, these alternative methods are not reliant on and/or may not involve optical measurements and lasers. As described more fully below, values received from an inertial reference system can be used to determine the orientation of the wellbore survey tool 530 at the first position.

Figure 22:
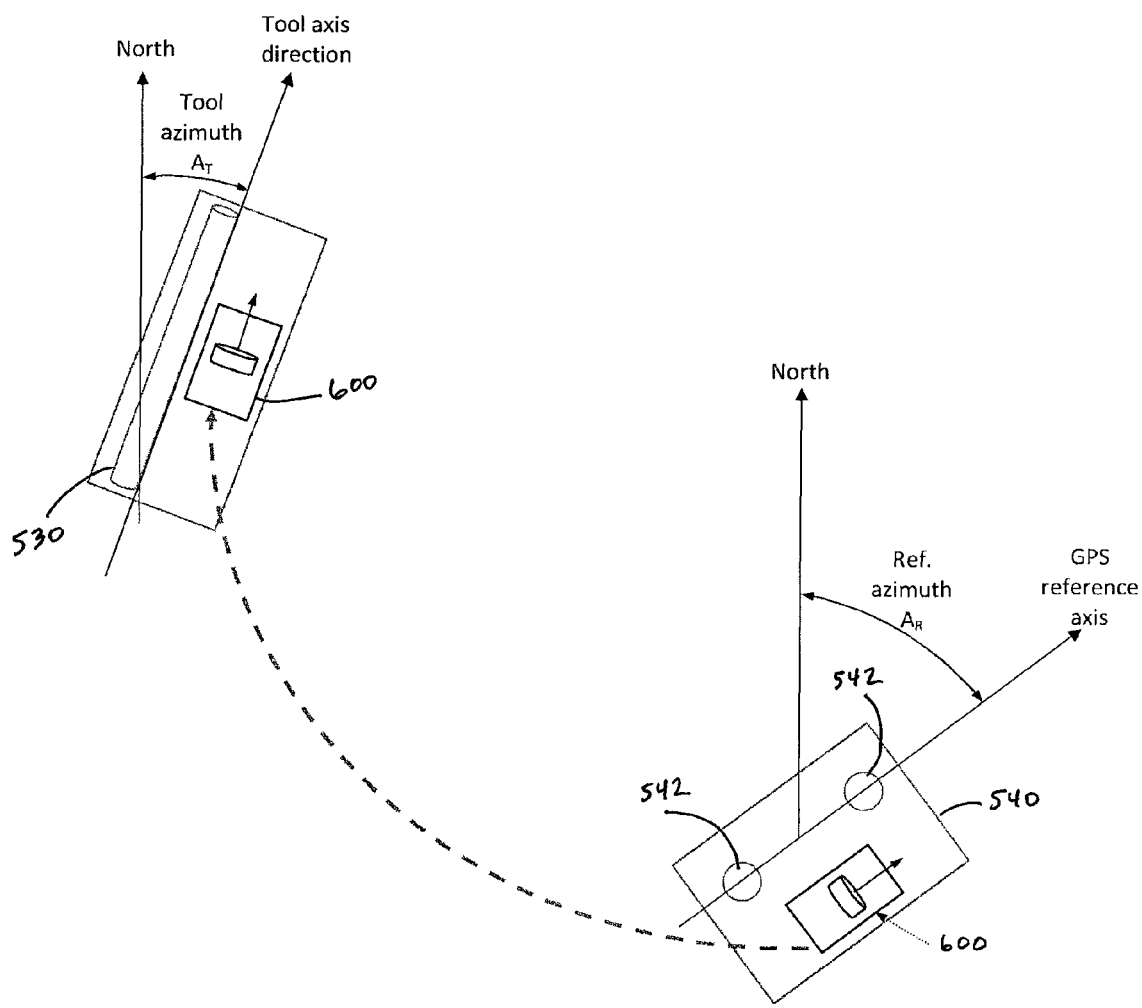
FIGS. 22 and 23 shows further example initialization configurations including inertial attitude and heading reference systems (AHRS), according to certain embodiments described herein.

FIG. 22 shows a reference platform containing the directional reference system 540 (e.g., GPS system) comprising satellite antennae 542 (two or more) and a survey tool 530 located at a location remote from the directional reference system 540. The method shown here involves the application of an inertial attitude and heading reference system (AHRS) unit 600 to store the azimuth reference set up using the directional reference system 540. This result can be achieved by initially mounting the AHRS unit 600 on the reference platform of the directional reference system 540. Having transferred the satellite reference to the AHRS unit 600, it can be detached from the platform and physically moved or carried to the entrance to the well where it can be affixed (e.g., clamped) to a platform to which the tool 530 is also attached. Assuming that the AHRS unit 600 and the tool 530 are accurately aligned relative to one another, or their relative orientation is known to sufficient accuracy, the azimuth defined by the AHRS unit 600 may be transferred to the survey tool 530.

For example, the reference azimuth ($A_R$) can be determined using the directional reference system 540 and can be transferred to the AHRS unit 600. While the AHRS unit 600 is carried to the wellbore entrance, the AHRS unit 600 maintains the attitude reference throughout. The AHRS unit 600 can then be attached to mounting blocks to which the survey tool 530 is also attached, and the attitude reference from the AHRS unit 600 can then be transferred to the survey tool 530. The survey tool 530 can then be switched to continuous survey mode and rotated to vertical above the wellbore entrance. Thus, in certain embodiments, before the orientation of the wellbore survey tool 530 is determined, the inertial reference system (e.g., AHRS unit 600) is moved from a first mounting position in which the inertial reference system is mounted at a predetermined orientation with respect to the directional reference system 540 to a second mounting position in which the inertial reference system is mounted at a predetermined orientation with respect to the wellbore survey tool 530.

The accuracy of the method involving the physical transfer of the AHRS unit 600 to the tool location can depend to some degree on the accuracy with which the AHRS unit 600 can be aligned mechanically in its respective mounting locations; firstly to the satellite antennae structure of the directional reference system 540 and subsequently to the survey tool 530. This alignment can be more challenging with the tool vertical, since the length of the baseline which controls the accuracy of this alignment may only be a few centimeters (the diameter of the tool) compared to meters (the length of the tool) in the case where the tool 530 is horizontal. However, the method described earlier of setting up a key way during tool assembly to define the orientation of the tool when affixed or clamped in place on the rig may be used (ref. FIGS. 19 and 20).

In certain cases, a significant advantage of this method, compared to the optical sighting methods described above, is a reduced dependency on the degree of rigidity of the rig structure. For example, the mounting arrangement over the relatively short distances between the AHRS unit 600 and the satellite antennae structure of the directional reference system 540, and between the AHRS unit 600 and the tool 530, are relevant to such a method.

Figure 23:
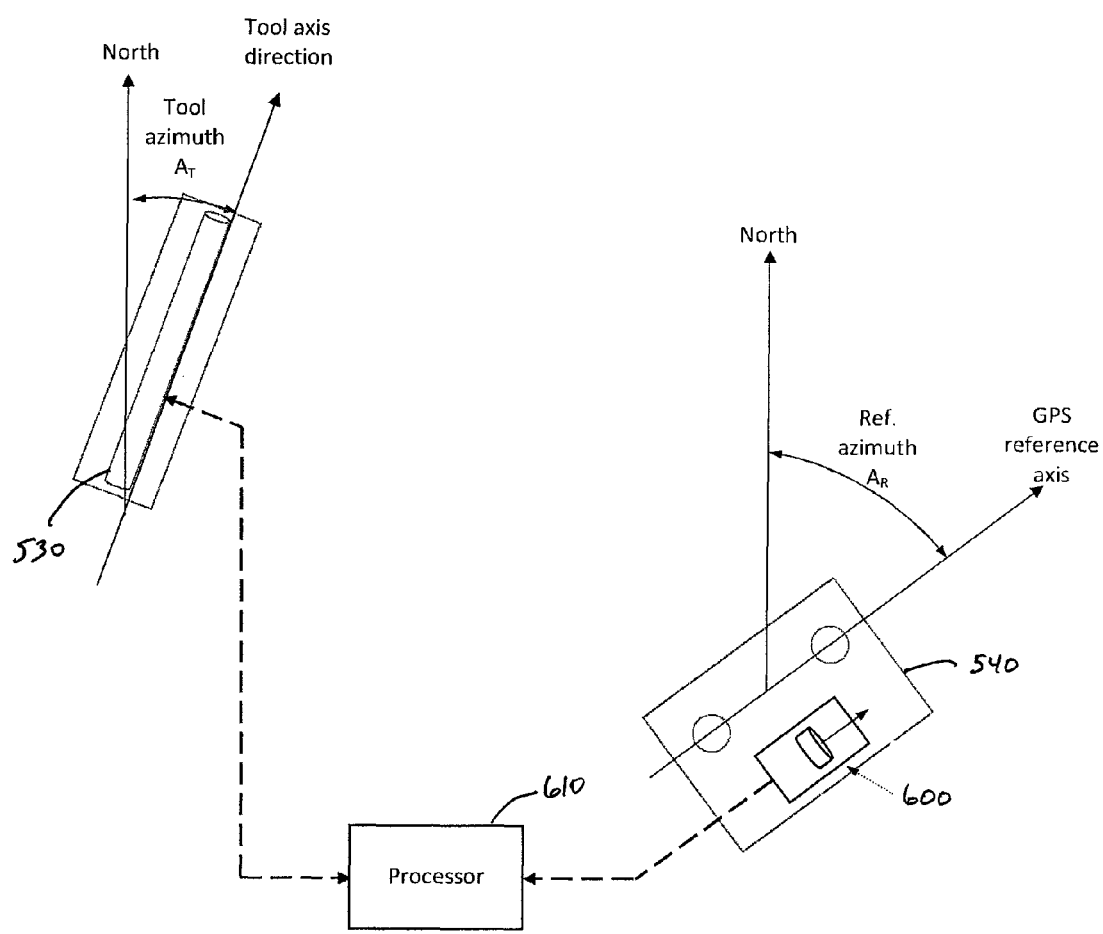

A further option, which according to certain embodiments does not involve the physical transport of the AHRS unit 600 between the reference site of the directional reference system 540 and the location of the tool 530, is shown in FIG. 23. In this case, angular rate measurements generated by the AHRS unit 600 and the gyroscopes in the survey tool 530 are compared and used to determine the relative orientation of the tool 530 and the AHRS unit 600 in a process referred to as inertial measurement matching. The time taken to perform this operation, and the accuracy to which it can be accomplished, can be a function of the motion of the rig or drilling platform on which the system is located. Given knowledge of the reference orientation (generated using the satellite system) to which the AHRS unit 600 is physically aligned and the relative orientation to the tool 530, as described above, the orientation of the tool 530 with respect to true north can be calculated. This information is then used to initialize the survey tool 530 before engaging continuous survey mode.

For example, the reference azimuth ($A_R$) can be determined using the directional reference system 540 and can be transferred to the AHRS unit 600. A comparison of the angular rate measured by the AHRS unit 600 and measured by the survey tool 530 can be performed by the processor 610, which can then determine the relative attitude ($\Delta A$) between the AHRS unit 600 and the tool 530. The tool azimuth can then be expressed as $A_T = A_R - \Delta A$. The tool 530 can then be switched to continuous survey mode and rotated to vertical above the wellbore.

Both methods involving the use of the AHRS unit 600 may be implemented with the survey tool 530 either vertical or horizontal, or anywhere in between.

In an alternative configuration, when the tool 530 is vertical or substantially vertical, a large spinning wheel (spinning vertically) is set in a full gravity weighted gimbal system. The gimbal system may have a window on the top of the box to see the gyro tool face angle, for example. One example usage of such a configuration is to attach the directional reference system 540 (e.g., GPS unit or fixture) and spin up in the reference position and then detach and move to the rig floor where it gets attached to the tool 530 (e.g., to a tool reference plate). Then the tool 530 can be turned in the gyro tool face plane until the AHRS unit 600 is back at its reference position, and the survey tool initialisation can be performed.

Although certain preferred embodiments and examples are discussed above, it is understood that the inventive subject matter extends beyond the specifically disclosed embodiments to other alternative embodiments and/or uses of the invention and obvious modifications and equivalents thereof. It is intended that the scope of the inventions disclosed herein should not be limited by the particular disclosed embodiments. Thus, for example, in any method or process disclosed herein, the acts or operations making up the method/process may be performed in any suitable sequence and are not necessarily limited to any particular disclosed sequence. Various aspects and advantages of the embodiments have been described where appropriate. It is to be understood that not necessarily all such aspects or advantages may be achieved in accordance with any particular embodiment. Thus, for example, it should be recognized that the various embodiments may be carried out in a manner that achieves or optimizes one advantage or group of advantages as taught herein without necessarily achieving other aspects or advantages as may be taught or suggested herein.

What is claimed is:

1. A method for determining an orientation of a wellbore survey tool at a first position with respect to a reference direction, the method comprising:
    receiving at least one first signal indicative of an orientation of a directional reference system with respect to the reference direction, the directional reference system positioned at a second position spaced from the first position;
    receiving at least one second signal indicative of a relative orientation of the wellbore survey tool with respect to the directional reference system; and
    determining the orientation of the wellbore survey tool at the first position in response at least in part to the at least one first signal and the at least one second signal.

2. The method of claim 1, wherein the first position is spaced a first distance from a wellbore entrance, and the second position is spaced a second distance from the wellbore entrance.

3. The method of claim 2, wherein a first horizontal component of the first distance is less than about 10 feet.

4. The method of claim 2, wherein a second horizontal component of the second distance is greater than a first horizontal component of the first distance by at least about 30 feet.

5. The method of claim 2, wherein a first vertical component of the first distance is less than about 20 feet.

6. The method of claim 1, wherein determining the orientation of the wellbore survey tool at the first position comprises:
    using one or more computer processors to receive the at least one first signal and the at least one second signal; and
    using the one or more computer processors to calculate the orientation of the wellbore survey tool at the first position.

7. The method of claim 6, further comprising using one or more optical sighting procedures to generate information of the at least one second signal indicative of the relative orientation of the wellbore survey tool with respect to the directional reference system.

8. The method of claim 7, wherein the one or more optical sighting procedures comprises:
    transmitting light along a first line extending between the directional reference system and a first reflecting surface mounted at a predetermined orientation with respect to the wellbore survey tool; and
    reflecting the light transmitted along the first line by the first reflecting surface.

9. The method of claim 8, wherein the wellbore survey tool at the first position is mounted substantially vertically with respect to the wellbore entrance.

10. The method of claim 9, further comprising moving the first reflecting surface to change the direction the light reflected by the first reflecting surface, wherein the first reflecting surface and the wellbore survey tool are mechanically coupled to one another and maintain their relationship with one another while being moved.

11. The method of claim 8, wherein the one or more optical sighting procedures further comprises:
    transmitting the light reflected by the first reflecting surface along a second line extending between the first reflecting surface and a second reflecting surface; and
    using the second reflecting surface to reflect the light transmitted along the second line.

12. The method of claim 11, wherein the light reflected by the second reflecting surface propagates along a third line extending between the second reflecting surface and the directional reference system, and wherein the first line, the second line, and the third line form a triangle.

13. The method of claim 1, further comprising mounting the wellbore survey tool at a predetermined orientation with respect to the directional reference system by engaging keying features affixed to the wellbore survey tool with corresponding keying structures affixed to a mount that is located at the first position.

14. The method of claim 1, further comprising:
    determining the tool highside angle while the wellbore survey tool is substantially horizontal;
    moving the wellbore survey tool to be substantially vertical, wherein the determining the orientation of the wellbore survey tool at the first position comprises calculating a gyro tool face angle at least in part based on the determined tool highside angle.

15. The method of claim 14, the tool highside angle is determined using accelerometer measurements from the wellbore survey tool.

16. The method of claim 15, wherein the tool highside angle is determined while the wellbore survey tool is mounted in a v-shaped channel that has been aligned with the local horizontal using a level sensor.

17. The method of claim 1, further comprising using values received from an inertial reference system to determine the orientation of the wellbore survey tool at the first position.

18. The method of claim 17, wherein, before the determining the orientation of the wellbore survey tool at the first position is performed, the inertial reference system is moved from a first mounting position in which the inertial reference system is mounted at a predetermined orientation with respect to the directional reference system to a second mounting position in which the inertial reference system is mounted at a predetermined orientation with respect to the wellbore survey tool.

19. The method of claim 17, wherein the determining the orientation of the wellbore survey tool at the first position further comprises comparing angular rate measurements by the wellbore survey tool and the inertial reference system.

20. The method of claim 17, wherein the inertial reference system comprises an attitude and heading reference system (AHRS).

21. A system for determining an orientation of a wellbore survey tool, the system comprising:
    one or more computer processors;
    one or more inputs configured to receive data indicative of an orientation of a directional reference system with respect to a reference direction and data indicative of a relative orientation of the wellbore survey tool with respect to the directional reference system, wherein the direction reference system is positioned at a first position relative to a wellbore entrance and a wellbore survey tool is mounted at a second position relative to the wellbore entrance spaced away from the first position; and
    a wellbore initialization module executing in the one or more computer processors and configured to, in response at least in part to the received data, calculate an orientation of the survey tool.

22. A system for use in determining an orientation of a wellbore survey tool, the system comprising:
- at least one directional reference system configured to provide data indicative of an orientation of the at least one directional reference system with respect to a reference direction; and
- an optical component mounted at a predetermined orientation with respect to the directional reference system and configured to transmit light along a line extending between the directional reference system and a first reflecting surface mounted at a predetermined orientation with respect to the wellbore survey tool.

23. The system of claim 22, further comprising a second reflecting surface positioned such that light reflected by the first reflecting surface propagates along a second line extending between the wellbore survey tool and the second reflecting surface and is reflected by the second reflecting surface.

24. The system of claim 23, wherein the light reflected by the second reflecting surface extends along a third line between the second reflecting surface and the directional reference system, wherein the first line, the second line, and the third line form a triangle.

25. The system of claim 24, further comprising an actuator configured to move the second reflecting surface along the third line.

26. The system of claim 22, further comprising an autocollimator.

* * * * *

UNITED STATES PATENT AND TRADEMARK OFFICE
CERTIFICATE OF CORRECTION

PATENT NO. : 8,294,592 B2
APPLICATION NO. : 13/407664
DATED : October 23, 2012
INVENTOR(S) : Weston et al.

It is certified that error appears in the above-identified patent and that said Letters Patent is hereby corrected as shown below:

In the Specifications

In column 1 at line 62, Change "(a)." to --($\Omega$).--.

In column 15 at line 26, Change "$\beta$" to --B--.

In column 24 at line 6 (approx.), Change " $\dot{I}$--$G_x$ cos $\alpha$+$G_y$ sin $\alpha$ +$\Omega_H$ sin A; " to -- $\dot{I}$=-$G_x$ cos $\alpha$+$G_y$ sin $\alpha$ +$\Omega_H$ sin A; --.

In column 25 at line 59 (approx.), Change " $z_{k+1}=H_{k+1} \cdot x_{k+1} v_{k+1}$, " to -- $z_{k+1}=H_{k+1} \cdot x_{k+1}+v_{k+1}$, --.

In column 26 at line 26 (approx.), Change " $K_{k+1}=P_{k+1/k}H_{k+1}^T[H_{k+1}P_{k+1/k}H_{k+1}^T - R_{k+1}]^{-1}$. " to -- $K_{k+1}=P_{k+1/k}H_{k+1}^T[H_{k+1}P_{k+1/k}H_{k+1}^T+R_{k+1}]^{-1}$. --.

In column 29 at line 46, Change " $(\hat{\omega}^b)$ " to --$(\omega^b)$--.

In column 29 at line 46, Change " $(\delta\hat{\omega}^b)$ " to --$(\delta\omega^b)$--.

In column 29 at line 60 (approx.), Change " $\delta z = z - \hat{z} = -[C_b^a \omega^b] \times \Phi - C_b^a \delta\omega^b$ " to -- $\delta z = z - \hat{z} = -[C_b^a \omega^b] \times \varphi - C_b^a \delta\omega^b$ --.

Signed and Sealed this
Second Day of July, 2013

Teresa Stanek Rea
*Acting Director of the United States Patent and Trademark Office*